United States Patent
McPhee et al.

(10) Patent No.: US 12,113,870 B2
(45) Date of Patent: Oct. 8, 2024

(54) AUTOMATIC GENERATION AND PROVISIONING OF NOTIFICATION DATA TO DYNAMICALLY SELECTED NETWORK-CONNECTED DEVICES

(71) Applicant: The Toronto-Dominion Bank, Toronto (CA)

(72) Inventors: Adam Douglas McPhee, Waterloo (CA); Matta Wakim, Petersburg (CA); Kyryll Odobetskiy, Waterloo (CA); John Jong-Suk Lee, Toronto (CA); Arun Victor Jagga, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 575 days.

(21) Appl. No.: 15/809,184

(22) Filed: Nov. 10, 2017

(65) Prior Publication Data
US 2019/0149623 A1 May 16, 2019

(51) Int. Cl.
*H04L 67/52* (2022.01)
*G06Q 30/0238* (2023.01)

(52) U.S. Cl.
CPC ......... *H04L 67/52* (2022.05); *G06Q 30/0238* (2013.01)

(58) Field of Classification Search
CPC .............................. H04L 67/18; G06Q 30/0238
USPC .................................................. 709/223
See application file for complete search history.

(56) References Cited

U.S. PATENT DOCUMENTS

| | | | |
|---|---|---|---|
| 7,643,902 B2 | 1/2010 | Tedesco et al. | |
| 8,452,656 B2 | 5/2013 | Nishar et al. | |
| 8,639,558 B2 | 1/2014 | Desai et al. | |
| 9,324,091 B2 | 4/2016 | Randell et al. | |
| 2011/0106549 A1 | 5/2011 | Hoff | |
| 2011/0282508 A1* | 11/2011 | Goutard | H02J 3/06 700/293 |
| 2015/0112790 A1 | 4/2015 | Wolinsky et al. | |
| 2015/0379554 A1 | 12/2015 | Copeland | |
| 2016/0086212 A1 | 3/2016 | Tietzen et al. | |
| 2016/0358144 A1 | 12/2016 | Thrope et al. | |

(Continued)

FOREIGN PATENT DOCUMENTS

WO WO 2003019446 3/2003

*Primary Examiner* — Suraj M Joshi
(74) *Attorney, Agent, or Firm* — Duane Morris LLP

(57) ABSTRACT

The disclosed embodiments include computer-implemented systems, apparatuses, and processes that automatically generate and provision notification data to a dynamically selected set of network-connected devices operating within a computing environment. For example, an apparatus receives a first signal including first information identifying first data exchanges initiated during a first temporal interval and compute, based on the first information, an expected value of a parameter of the first data exchanges during a second temporal interval. When the expected parameter value is inconsistent with a target parameter value, the apparatus loads, from a storage unit, second information characterizing a second data exchange capable of initiation during the second temporal interval, and generates and transmits a second signal, via the communications unit, to a client device disposed that is disposed proximate to a predetermined geographic position and that exhibits a first device characteristic associated with the second data exchange.

21 Claims, 5 Drawing Sheets

(56) References Cited

U.S. PATENT DOCUMENTS

2017/0091883 A1 3/2017 Greystoke et al.
2017/0330278 A1* 11/2017 Radulescu ............ H04L 43/106

* cited by examiner

AUTOMATIC GENERATION AND PROVISIONING OF NOTIFICATION DATA TO DYNAMICALLY SELECTED NETWORK-CONNECTED DEVICES

TECHNICAL FIELD

The disclosed embodiments generally relate to computer-implemented systems and processes that automatically generate and provision notification data to dynamically selected network-connected devices.

BACKGROUND

Today, technologies that manage supply chain dynamics continuously evolve in response to advances in computing technologies and monitoring equipment. An intersection between these computer-implemented innovations, and inventory management technologies implemented at a point-of-sale, often requires inefficient manual intervention and coordination.

SUMMARY

In some examples, an apparatus includes a communications unit, a storage unit storing instructions, and at least one processor coupled to the communications unit and the storage unit. The at least one processor is configured to execute the instructions to receive a first signal via the communications unit. The received first signal includes first information identifying first data exchanges initiated during a first temporal interval. The at least one processor is also configured to execute the instructions to compute, based on the first information, an expected value of a parameter of the first data exchanges during a second temporal interval and when the expected parameter value is inconsistent with a target parameter value, load, from the storage unit, second information characterizing a second data exchange capable of initiation during the second temporal interval. The at least one processor is configured to execute the instructions to generate and transmit a second signal to a client device that is disposed proximate to a predetermined geographic position and that exhibits a first device characteristic associated with the second data exchange. The transmitted second signal includes a portion of the second information, the transmitted portion of the second information causing the client device to present data associated with the second data exchange on a corresponding interface.

In additional examples, a computer-implemented method includes receiving, by at least one processor, a first signal that includes first information identifying first data exchanges initiated during a first temporal interval and based on the first information, computing, by the at least one processor, an expected value of a parameter of the first data exchanges during a second temporal interval. When the expected parameter value is inconsistent with a target parameter value, the method also includes identifying and loading, by the at least one processor, and from a storage unit, second information characterizing a second data exchange capable of initiation during the second temporal interval. The method also includes generating and transmitting, by the at least one processor, a second signal to a client device that is disposed proximate to a predetermined geographic position and that exhibits a first device characteristic associated with the second data exchange. The transmitted second signal includes a portion of the second information, the transmitted portion of the second information causing the client device to present data associated with the second data exchange on a corresponding interface.

Further, in some examples, a tangible, non-transitory computer-readable medium stored instructions that, when executed by at least one processor, perform a method. The method includes receiving a first signal that includes first information identifying data exchanges initiated during a first temporal interval and based on the first information, computing an expected value of a parameter of the first data exchanges during a second temporal interval. When the expected parameter value is inconsistent with a target parameter value, the method also includes identifying and loading, from a storage unit, second information characterizing a second data exchange capable of initiation during the second temporal interval. The method also includes generating and transmitting a second signal to a client device that is disposed proximate to a predetermined geographic position and that exhibits a first device characteristic associated with the second data exchange. The transmitted second signal includes a portion of the second information, the transmitted portion of the second information causing the client device to present data associated with the second data exchange on a corresponding interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
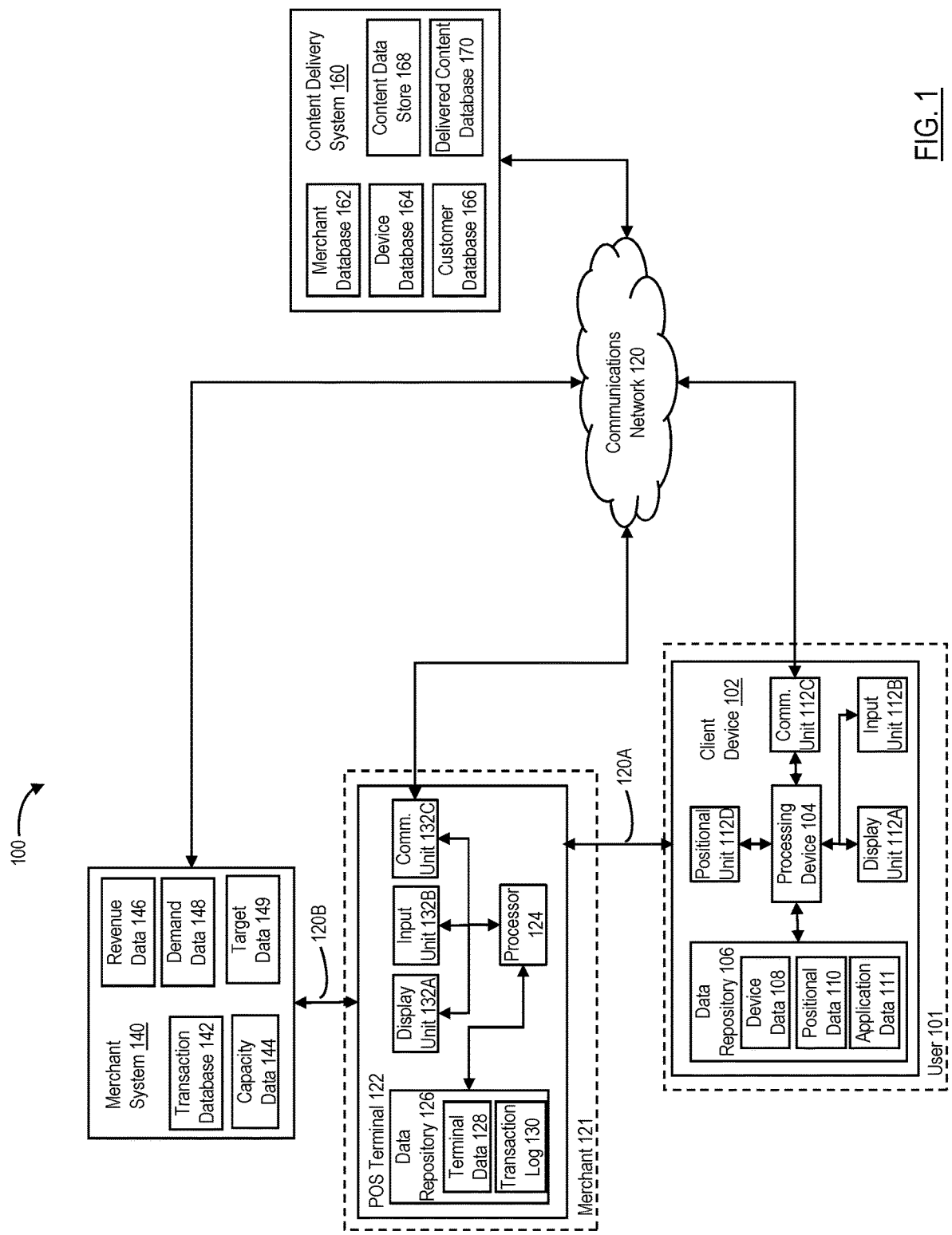
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented systems, devices, and processes that, among other things, automatically generate and provision notification data to a dynamically selected set of network-connected devices operating within a computing environment. In some examples, as described herein, a computing system operating within the computing environment may receive a first signal that includes information identifying and characterizing data exchanges initiated during a corresponding temporal interval (e.g., "first" data exchanges initiated during a "first" temporal interval). Further, and as described herein, each of the data exchanges may be initiated in accordance with a first data-exchange characteristic (such as, but not limited to, a first value of a data-exchange parameter), and the first information may specify the first data-exchange characteristic (e.g., the first value of the data-exchange parameter) for each of the first data exchanges. In some instances, the computing system may receive the first signal from a network-connected terminal device operating the computing environment, or from one or more additional computing systems operating within the computing environment, through secure module-to-module communications established via a corresponding programmatic interface.

Based on the received information, which characterizes the first data exchanges, the computing system may perform operations that, among other things, determine an expected characteristic of the data exchanges during another temporal interval, e.g., a "second" temporal interval. In some examples, the expected characteristic may correspond to an expected value of an aggregate parameter of the data exchanges during the second temporal interval. Further, and as described herein, the computing system may determine whether the expected characteristic is consistent with a target characteristic associated with data exchanges during the second temporal interval. For instance, the target characteristic may correspond to a target value of the aggregate parameter, which may be associated with the network-connected terminal device or the one or more additional computing systems, and the computing system may determine whether the expected value of the aggregate parameter is consistent with the target value.

In response to a determined inconsistency, the computing system may identify and load, from a tangible, non-transitory memory, additional information that characterizes a second data exchange capable of initiation during the second temporal interval. The second data exchange may, in some instance, be associated with a second data-exchange characteristic (such as, but not limited to, a second value of the data-exchange parameter), and the additional information may include data that specifies the second data-exchange characteristic (e.g., the second value of the data-exchange parameter). Further, in some examples, the second data exchange may be capable of initiation at the network-connected terminal device, or at the one or more additional computing systems in communication with the network-connected terminal device, during the second temporal interval.

The computing system may generate and transmit a second signal that includes portions of the additional information to one or more dynamically selected devices, and the transmitted portions of the additional information may cause each of the devices to present a textual, graphical, audible, or tactile representation of the second data exchange through a corresponding interface. Responsive to the presented representation, one or more of the devices may initiate the second data exchange during the second temporal interval and in accordance with the second data-exchange characteristic (e.g., the second value of the data-exchange parameter). Further, in some examples, an actual value of the aggregate parameter during the second temporal interval, which characterizes both initiated first and second data exchanges, may be equivalent to or may exceed the target value of the aggregate parameter.

As described herein, and in response to the presented representation, the one or more devices may initiate the second data exchange at the network-connected terminal device (or at the one or more additional computing systems in communication with the network-connected terminal device). In one example, the network-connected terminal device may correspond to a network-connected point-of-sale (POS) terminal associated with a merchant, and the initiated first and second data exchanges may facilitate an approval and an execution of a transaction initiated at terminal device by corresponding ones of the devices. In other examples, as described herein, the one or more devices may initiate the second data exchange with the one or more additional computing systems, which may be maintained and operated by the merchant (e.g., a merchant computing system). These one or more computing systems may, in some examples, execute one or more application program modules that establish a digital portal (e.g., a digital POS) capable of initiating and executing a transaction initiated corresponding ones of the devices.

The initiated transaction may, in some instances, correspond to a purchase transaction in which a customer (e.g., that operates a corresponding one of the devices) purchases a good or service from the merchant at an agreed-upon price (e.g., a transaction amount). Further, the parameter values charactering the initiated purchase transaction (e.g., corresponding one of the first or second values of the data-exchange parameters) may include, but are not limited to, the transaction amount, data identifying the customer or the merchant, data identifying the purchased good or service, or a time or date associated with the initiated purchase transaction. In some instances, the customer may operate the corresponding device, and in response to input provided to the corresponding client device by the customer (e.g., through an input unit), the executed application program may cause the client device to transmit data identifying a payment instrument available to fund the purchase transaction (e.g., as provisioned to the client device) to the POS terminal or to the merchant computing system across a corresponding communications network.

Further, in some examples, the second temporal interval may include, but is not limited to a business day of the merchant (e.g., as establish by the merchant's operational hours), a business week or month of the merchant (e.g., as established by consecutive business days), a portion of a business day, week, or month of the merchant, or any additional or alternate temporal interval of significance to the merchant, such as a calendar day, week, or month. As described above, the first temporal interval may correspond to any portion of the second temporal interval, e.g., a portion of the business day, week, or month described above, such as an operational shift of the merchant.

In additional examples, the expected or target value of the aggregate parameter may correspond to an amount of revenue generated by purchase transactions initiated at the terminal device of the merchant (e.g., an expected or target amount of revenue), or a rate of revenue generation or transaction initiation. For instance, the target revenue amount may be established by the merchant and may facilitate a levelling of revenue during one or more business days (e.g., to ensure a total revenue generated on a Sunday is consistent with a total revenue generated on Sunday) or portions of business days (e.g., to ensure a generation of a particular amount of revenue during afternoon operating shifts). In other instances, the target value of the aggregate parameter may correspond to a revenue optimization target that maximizes the amount of revenue generated by the purchase transactions during the one or more business days or during the portions of the business days.

In other examples, the expected or target value of the aggregate parameter may correspond to a quantity and/or type of goods or services purchased by customers of the merchant during the second temporal interval (e.g., an expected or target amount of purchased goods or services), or a rate at which consumers purchase the quantities or types of goods or services. The target quantity of purchased goods or services may be established by the merchant, and in some aspects, may be constrained by and customized to an available inventory of the goods or services held by the merchant. For example, the merchant may establish the target amount of purchased goods or services in order to facilitate a sale of all or a portion of an available inventory of a particular product during a business day or a portion of the business day. In other instances, the target value of the aggregate parameter may correspond to an inventory optimization target that maximizes a volume of one or more goods or services sold by the merchant during the business day or the portion of the business day (e.g., to ensure that the maximum volume of the one or more are sold prior to an expiration date).

Further, in some examples, the information characterizing the second data exchange may correspond to a promotional campaign that, when delivered to a device by the computing system, may provide an incentive to the customer that operate the device to initiate purchase transaction with the merchant during the second temporal interval. For instance, the promotional campaign may include, but is not limited to, a discount on purchases from the merchant (e.g., a merchant-specific promotion) or a discount on a particular item purchased from the merchant (e.g., an inventory-specific promotion), and a magnitude of the discount may be established by the merchant (e.g., a percentage discount or a discounted price).

Certain of the exemplary, computer-implemented processes described herein, which automatically generate promotional campaign data consistent with actual or expected sales data generated at a merchant POS terminal or a merchant computing system, and that deliver the promotional campaign data to dynamically selected devices across secure, module-to-module programmatic channels, can be implemented in addition to or as an alternate to conventional promotional processes, such as those that provide fixed promotional materials to a predetermined set of devices via email, text messaging, or other out-of-application communications channels. By facilitating post-transaction messaging through secure, module-to-module programmatic channels, and by dynamically modifying portions of the delivered promotional campaigned data based on changes in actual or expected sales, as monitored via the merchant POS terminal or the merchant computing system, certain of the disclosed embodiments may reduce the computational load on computer systems maintained by notification services.

I. Exemplary Computing Environments

FIG. 1 is a diagram illustrating an exemplary computing environment 100, consistent with certain disclosed embodiments. As illustrated in FIG. 1, environment 100 may include one or more devices, such as client device 102, and a point-of-sale (POS) terminal 122, a merchant system 140, and a content delivery system 160, each of which may be interconnected to through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Further, as illustrated in FIG. 1, client device 102 and POS terminal 122 may also exchange data across a direct channel of communications, e.g., direct communications channel 120A, and POS terminal 122 and merchant system 140 may also exchange data across an additional direct channel of communication, e.g., direct communications channel 120B. In some examples, direct communications channel 120A may correspond to a wireless communications channel established across a short-range communications network, examples of which include, but are not limited to, a wireless LAN, e.g., a "Wi-Fi" network, a network utilizing RF communication protocols, a NFC network, a network utilizing optical communication protocols, e.g., infrared (IR) communications protocols, and any additional or alternate communications network, such as those described above, that facilitate peer-to-peer (P2P) communication between POS terminal 122 and client device 102. Further, direct communications channel 120B may include a direct wired or wireless communications channel, such as, but not limited to, one or more of the exemplary communications channels and protocols described herein.

POS terminal 122 may, in some instances, be associated with a merchant, e.g., merchant 121, and client device 102 may be associated with or operated by a customer of merchant 121, e.g., user 101. For example, POS terminal 122 may be disposed within a physical location of merchant 121, such as a location where a customer, e.g., user 101, provides payment for goods and/or services (e.g., at a cash register at merchant 121). In other examples, not illustrated in FIG. 1, POS terminal 122 may correspond to one or more application program modules executed by a computer system maintained by merchant 121 (e.g., merchant system 140). In one aspect, client device 102 may correspond to a consumer payment device that, upon establishing communication with POS terminal 122 across direct communications channel 120A, or upon establishing communication with merchant system 140 across communications channel 120, provides data to POS terminal 122 or to merchant computing system 140 specifying a payment instrument available for use in an initiated transaction for the goods and/or services.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, such as a web browser, an application associated with content delivery system 160 (e.g., a mobile application), and additionally or alternatively, a payment application associated with a payment service (e.g., a mobile application that establishes and maintains a mobile wallet), as described below.

Client device 102 may also establish and maintain, within the one or more tangible, non-tangible memories, one or more structured or unstructured data repositories or databases, e.g., data repository 106, that include device data 108, positional data 110, and application data 111. In one instance, device data 108 may include data that uniquely identifies client device 102, such as a media access control (MAC) address of client device 102 or an IP address assigned to client device 102, and positional data 110 may geo-location information that identifies geographic positions of client device 102 at corresponding times and dates (e.g., a latitude, longitude, or altitude measured by an on-board positioning unit at regular temporal intervals).

Referring back to FIG. 1, client device 102 may also include a display unit 112A configured to present interface elements to user 101, and an input unit 112B configured to receive input from user 101, e.g., in response to the interface elements presented through display unit 112A. By way of example, display unit 112A may include, but is not limited to, an LCD display unit or other appropriate type of display unit, and input unit 112B may include, but input not limited to, a keypad, keyboard, touchscreen, voice activated control technologies, or appropriate type of input unit. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include a communications unit 112C, such as a wireless transceiver device, coupled to processor 104 and configured by processor 104 to establish and maintain communications with network 120 using any of the communications protocols described herein.

Additionally, in some aspects, client device 102 may include a positioning unit 112D, such as, but not limited to, an on-board Global Positioning System (GPS) receiver, an on-board assisted GPS (eGPS) receiver, or a positioning unit consistent with other positioning systems. Positioning unit 112D may be configured by processor 104 to determine a geographic position of client device 102 (e.g., a longitude, latitude, altitude, etc.) at regular temporal intervals, and to store data indicative of the determined geographic position within a portion of corresponding tangible, non-transitory memory (e.g., positional data 110), along with data identifying the temporal interval (e.g., a time stamp specifying a corresponding time and/or date).

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

POS terminal 122 may correspond to a computing device that includes one or more tangible, non-transitory memories storing data and/or software instructions, and one or more processors, e.g., processor 124, configured to execute the software instructions. The one or more tangible, non-transitory memories may, in some aspects, store software applications, application modules, and other elements of code, which when executed by the one or more processors, cause POS terminal 122 to perform operations consistent with the disclosed embodiments, as described below. Further, in certain aspects, POS terminal 122 may also store and maintain a data repository, e.g., data repository 126, within the one or more tangible, non-transitory memories.

Data repository 126 may, for example, include terminal data 128 that uniquely identifies POS terminal 122 within network 120, and further, a transaction log 130 that identifies transactions initiated at POS terminal 122 by the one or more client device operating within environment 100, such as client device 102. By way of example, transaction log 130 may include structured or unstructured data records that, for a corresponding one of the initiated transactions, include a unique identifier of the corresponding transaction, an identifier of a party that initiated the corresponding transaction, and values of parameters that characterize the corresponding transaction, such as an amount of the corresponding transaction (e.g., a transaction amount), a transaction date or time, and/or an identifier of a good or service involved in the corresponding transaction (e.g., an assigned universal product code (UPC)). Further, in some examples, POS terminal 122 may also transmit portions of the data records maintained within transaction log 130 to merchant system 140, e.g., across direct communications channel 120B, at regular or predetermined intervals, or in response to a detected triggering event, such as amount of available memory that falls below a threshold amount.

As described above, POS terminal 122 may be disposed within a physical location of the merchant, such as a location where a customer, such as user 101, may provide payment for goods and/or services. POS terminal 122 may, in some instances, include a display unit 132A configured to present interface elements to user 101, and an input unit 132B configured to receive input from user 101, e.g., in response to the interface elements presented through display unit 132A. By way of example, display unit 132A may include, but is not limited to, an LCD display unit or other appropriate type of display unit, and input unit 132B may include, but input not limited to, a keypad, keyboard, touchscreen, voice activated control technologies, or appropriate type of input device. Further, in additional aspects (not depicted in FIG. 1), the functionalities of display unit 132A and input unit 132B may be combined into a single device, e.g., a pressure-sensitive touchscreen display unit that presents interface elements and receives input from user 101.

POS terminal 122 may also include a communications unit 132C, such as a wireless transceiver device, coupled to processor 124 and configured by processor 124 to establish and maintain communications with network 120 using any of the communications protocols described herein. Additionally, in some aspects, communications unit 132C may also be configured by processor 124 to establish and maintain direct communications channel 120B with merchant system 140, e.g., using any of the communications protocols described herein. For example, POS terminal 122 may transmit, via communications unit 132C, signals that include one or more of the data records maintained within transaction log 130 (e.g., which identify and characterize transactions initiated at POS terminal 122 by one or more of the client devices, such as client device 102) to merchant system 140 across direct communications channel 120B, and additionally or alternatively, to content delivery system 160 across network 120.

Examples of POS terminal 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations consistent with disclosed embodiments.

The disclosed embodiments are not limited to such POS terminals, and in additional aspects, POS terminal 122 may correspond to one or more application program modules executed by a computer system maintained by merchant 121 (e.g., merchant system 140) one or more computing systems operating within environment 100, one or more client devices operating within environment 100, such as client device 102. In other embodiments, POS terminal 122 may represent a device communicatively coupled to client device 102 to provide mobile point-of-sale and payment services, such as a Square™ device in communication with client device 102.

Referring back to FIG. 1, merchant system 140 and content delivery system 160 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary processes described herein, which may automatically generate or modify digital content in accordance with monitored network conditions, and which may deliver the portions of the customized digital content to dynamically selected network-connected devices through corresponding programmatic interfaces. In other instances, and consistent with the disclosed embodiments, one or more of merchant system 140 and content delivery system 160 may correspond to a distributed system that includes computing components distributed across one or more networks, such as network 120, or other networks, such as those provided or maintained by cloud-service providers.

In some aspects, merchant system 140 may be associated with and maintained by merchant 121, and may be coupled to POS terminal 122 via direct communications channel 120B. For example, merchant system 140 may include, but is not limited to, a cash register or similar device operated by merchant 121, and merchant system 140 may be configured to receive data identifying a purchased good or service (e.g., the UPC code assigned to the purchase good or service, a unit price of the purchased good or service, etc.) through a corresponding input unit, such as, but not limited to an optical scanner or keypad. Merchant system 140 may be configured to transmit portions of the received data across direct communications channel 120B to POS terminal 122, which may perform operations that render and present a representation of the received data portions through a corresponding interface, such as display unit 132A.

As illustrated in FIG. 1, merchant system 140 may establish and maintain a transaction database 142, capacity data 144, revenue data 146, and demand data 148 within the one or more tangible, non-transitory memories. In some aspects, transaction database 142 may include structured or unstructured data records identifying and characterizing transactions initiated by one or more client devices operating within environment 100, such as, but not limited to, client device 102. By way of example, and for a transaction initiated at POS terminal 122 by client device 102, the corresponding data record within transaction database 142 may include, but is not limited to, a unique transaction identifier, an identifier of a party that initiated the initiated transaction (e.g., an IP address of client device 102), and values of parameters that characterize the corresponding transaction, such as a transaction amount, a transaction date or time, and/or an identifier of a good or service involved in the corresponding transaction (e.g., an assigned universal product code (UPC)). Further, merchant system 140 may receive data characterizing the initiated transactions from POS terminal 122, e.g., across direct communications channel 120B, at regular or predetermined intervals, or in response to an occurrence of a triggering event at POS terminal 122. In other examples, one or more data records within transaction database 142 associated with a transaction initiated at merchant system 140 (e.g., through a software-implemented or digital POS terminal) may include information similar to that described herein.

In some aspects, capacity data 144 may characterize an available inventory of goods or services offered for sale by merchant 121, along with pricing data characterizing unit prices for each of the goods or services. Revenue data 146 may include, but is not limited to, actual revenue data characterizing an actual amount of revenue derived from transactions initiated during one or more temporal intervals, and expected revenue data that characterizes a predicted or forecasted amount of revenue expected during the one or more temporal intervals. Examples of these temporal intervals include, but are not limited to, a particular operational shift or portion of a business day of merchant 121, a business day of merchant 121, or combinations of one or more business days (e.g., an operational quarter for accounting purposes) of merchant 121.

Demand data 148 may include data characterizing an actual demand exhibited by customers of merchant 121 for one or more of the available goods or services during a corresponding prior temporal interval, such as a prior operational shift or a prior operational day. For example, as described herein, merchant 121 may correspond to a bakery that offers breakfast pastries for sale to customers throughout a business day that includes breakfast shift (e.g., 6:00 a.m. to 10:00 a.m.), a lunch shift (e.g., 10:00 a.m. to 1:00 p.m.), and an afternoon shift (e.g., 1:00 p.m. to 3:00 p.m.). In some instances, the actual demand data, as maintained within demand data 148, may characterize an actual demand for these breakfast pastries as a function of price (and/or other values of transaction parameters) during one or more of the operations shifts of the bakery, and may be based on an aggregation of the data characterizing prior transactions initiated during these operations shifts (e.g., as maintained within transaction database 142).

Demand data 148 may also include forecasted demand data that characterizes an expected demand for one or more of the available goods or services during a future temporal interval, such as a future operational shift or a future business day. For example, the forecasted demand data may include, but is not limited to, an expected demand for the breakfast pastries during a future operational shift of the bakery, such as a future breakfast shift, which merchant system 140 may compute based on the actual demand for the breakfast pastries during prior operational shifts of the bakery and on portions of transaction database 142. Further, and as described herein, merchant system 140 may compute the expected demand as a function of a unit price of the goods or services, or as a function of values of additional or alternate transaction parameters.

In some instances, the actual or forecasted demand data may establish a relationship between a unit price of a particular good or service offered for sale by merchant 121 (e.g., a unit price of each breakfast pastry offered for sale by the bakery) and the actual or forecasted demand exhibited by customers of merchant 121 for the particular good or service. For example, the actual or forecasted demand data may establish an actual or forecast demand curve for the particular good or service (e.g., the breakfast pastries offered for sale by the bakery), which specifies the actual or forecast demand as a function of unit price. The disclosed embodiments are not limited to these examples of actual or forecasted demand data, and in other aspects, the actual or forecasted demand data may establish a relationship between the actual or forecasted demand exhibited by customers of merchant 121 for the particular good or service and a value of any additional or alternate parameter, or combinations of parameters, that characterize the particular good or service.

Target data 149 may identify one or more revenue or capacity targets for transactions involving merchant 121 and initiated during future temporal intervals (e.g., initiated at POS terminal 122 and other POS terminals communicating with merchant system 140, including the software-implemented or digital POS terminal described herein). In some instances, the one or more revenue or capacity targets may be specified by merchant 121, and may be modified or updated at regular or predetermined intervals, or in response to an occurrence of certain triggering events, such as an extended period of closure of merchant 121. For examples, the one or more revenue targets may include, but are not limited to, a specified amount of revenue derived from transactions initiated at POS terminal 122 during a specified temporal interval, e.g., a morning, lunch, or afternoon shift of the bakery. In other examples, the one or more revenue targets may include a revenue optimization target that indicates a desire of merchant 121 to maximize an amount of revenue derived from the transactions initiated at POS terminal 122 during the specified temporal interval, as limited by the available inventory of the goods or services.

Additionally, in some examples, the one or more capacity targets may include, but are not limited to, a specified reduction in the available inventory of a particular good or service due to transactions initiated at POS terminal 122 during the specified temporal interval, e.g., the morning, lunch, or afternoon shift of the bakery. For instance, the one or more capacity targets may indicate a determination by the bakery to sell, during each business day, the entire available inventory of breakfast pastries during the morning, lunch, or afternoon shift, e.g., in response to an expected temporal expiration of these pastries. In other examples, the one or more capacity targets may include an inventory optimization target that indicates a desire of merchant 121 to maximize a reduction in the available inventory of a particular good or service due to transactions initiated at POS terminal 122 during the specified temporal interval, e.g., a specific operational shift, a business day, etc.

In some examples, as described herein, POS terminal 122 may execute one or more application programs, which may cause POS terminal 122 to perform operations that poll merchant system 140 to obtain portions of transaction database 142, capacity data 144, revenue data 146, demand data 148, and target data 149, e.g., across direct communications channel 120B. POS terminal 122 may perform further operations that transmit the obtained portions of transaction database 142, capacity data 144, revenue data 146, demand data 148, and target data 149 across network 120 to content delivery system 160 at regular or predetermined internals, or in response to a detection of one or more triggering events. In other examples, described herein, merchant system 140 may perform additional or alternate operations that extract and transmit portions of transaction database 142, capacity data 144, revenue data 146, demand data 148, and target data 149 across network 120 to content delivery system 160 at regular or predetermined internals, or in response to a detection of one or more triggering events.

The exchange of data between POS terminal 122 and merchant system 140, between POS terminal 122 and content delivery system 160, and/or between merchant system 140 and content delivery system 160, may occur through corresponding programmatic interfaces (e.g., through one or more secure, module-to-module handshakes), and may proceed in accordance with any of the communications protocols described herein. In some aspects, content delivery system 160 may associate the received portions of transaction database 142, capacity data 144, revenue data 146, demand data 148, and target data 149 with merchant 121 and/or POS terminal 122, and may store the associated data within one or more tangible, non-transitory memories.

In other aspects, not illustrated in FIG. 1, POS terminal 122 may maintain, within a locally accessible memory, data consistent with the one or more portions of transaction database 142, capacity data 144, revenue data 146, demand data 148, or target data 149, e.g., within data repository 126. POS terminal 122 may be configured by the executed application program to perform additional operations that transmit the portions of the locally maintained data to content delivery system 160 at the regular or predetermined intervals, or in response to the detected occurrence of the triggering event, without prior communication with merchant system 140. As described below, content delivery system 160 may associate the received portions of the locally maintained data with merchant 121 and/or POS terminal 122, and may store the associated data within one or more tangible, non-transitory memories.

Based on information characterizing exchanges of data initiated during a first temporal interval, content delivery system 160 may perform any of the exemplary processes described herein to automatically generate or modify digital content in accordance with a parameter-based target, and to transmit that customized digital content elements to one or more dynamically selected client devices, such as client device 102, disposed proximate to a predetermined geographic position, such as a location of merchant 121, during the second temporal interval. In some instances, and as described herein, the predetermined geographic position, such as the location of merchant 121, may correspond to a geographic position of POS terminal 122 within a corresponding geographic region. Content delivery system 160 may transmit the digital content elements to client device 102 (and to additional or alternate ones of the selected client devices) across network 120 through a programmatic interface maintained by an application program executed by client device 102 (and by the additional or alternate ones of the dynamically selected client devices).

In some aspects, the parameter-based target may include a revenue or capacity target established by merchant 121, such as those described above, and when presented through an interface generated by client device 102 (and/or the additional or alternate ones of the selected client devices), the digital content elements provide an incentive that facilitates an initiation of a transaction involving merchant 121 by client device 102 and/or the additional or alternate ones of the selected client devices (e.g., at POS terminal 122) during the second temporal interval. As described herein, an aggregation of parameter values that characterize the transactions initiated during the second temporal interval may be consistent with, or exceed, the revenue or capacity target established by merchant 121. In further instances, content delivery system 160 may dynamically modify portions of the advertising content (e.g., to increase an amount of an offered discount on a particular good or service, etc.) to further incentivize the initiation of transactions involving merchant 121 (e.g., at POS terminal 122, merchant system 140, and/or other POS terminals associated with merchant 121) during the second temporal interval.

Referring back to FIG. 1, content delivery system 160 may maintain, within one or more tangible, non-transitory memories, data that facilitates the automatic generation or modification of the digital content (e.g., that incentivizes the initiation of a transaction by client device 102 or other selected client devices during the second temporal interval), and that facilitates the transmission of that digital content to client device 102 and/or the additional or alternate selected client devices. By way of example, as illustrated in FIG. 1, content delivery system 160 may establish and maintain a merchant database 162, a device database 164, a customer database 166, a content data store 168, and a delivered content database 170.

Merchant database 162 may include structured or unstructured data records identifying and characterizing one or more merchants, such as merchant 121, that participate in the exemplary processes described herein. In some aspects, merchant database 162 may include, for merchant 121, data records that include a unique identifier of merchant 121 (e.g., merchant name), identifiers of one or more terminal devices associated with or operated by merchant 121 (e.g., an IP address, MAC address, or other unique network identifier of POS terminal 122), and additional or alternate data that characterizes merchant 121 or POS terminal 122, such as an address of merchant 121 or a geo-location of POS terminal 122.

Merchant database 162 may also maintain, within the one more data records associated with merchant 121, transaction data that identifies and characterizes transactions initiated at POS terminal 122 by one or more client devices operating within environment 100, such as, but not limited to, client device 102. By way of example, and for a transaction initiated at POS terminal 122 by client device 102, the corresponding transaction data may include, but is not limited to, a unique transaction identifier, a unique identifier of POS terminal 122 and client device 102 (e.g., an IP address or a MAC address), and values of parameters that characterize the corresponding transaction, such as a transaction amount, a transaction date or time, and/or an identifier of a good or service involved in the corresponding transaction (e.g., an assigned universal product code (UPC)). As described herein, content delivery system 160 may receive portions of the transaction data from POS terminal 122 or from merchant system 140 (e.g., across network 120) at regular or predetermined intervals, or in response to an occurrence of a triggering event.

Further, merchant database 162 may maintain, within the one more data records associated with merchant 121, capacity data, revenue data, demand data, and additionally or alternatively, parameter-based target data. For example, the maintained capacity data may characterize a current available inventory of goods or services offered for sale by merchant 121, along with pricing data identifying unit prices for each of the offered goods or services. Revenue data may include, but is not limited to, actual revenue data characterizing an actual amount of revenue derived from transactions involving merchant 121 (e.g., as initiated at POS terminal 122) during one or more temporal intervals, and/or expected revenue data that characterizes a predicted or forecasted amount of revenue expected during the one or more temporal intervals.

In further examples, as described herein, the demand data may include data characterizing an actual demand exhibited by customers of merchant 121 for one or more of the available goods or services during a corresponding prior temporal interval (e.g., a prior operational shift or a prior business day of merchant 121), and additionally or alternatively, forecasted demand data that characterizes an expected demand for one or more of the available goods or services during a corresponding future temporal interval, such as a future operational shift or a future business day of merchant 121. The parameter-based target data may, in some examples, identify and specify one or more parameter-based targets for transactions initiated during future temporal intervals, such the revenue- or inventory-based targets described herein.

In some examples, content delivery system 160 may receive, across network 120, portions of the transaction, capacity, revenue, demand, and/or parameter-based target data from POS terminal 122 and/or from merchant system 140 at regular or predetermined intervals (e.g., at the conclusion of each operational shift or business day of merchant 121), or in response to a detection of a triggering event (e.g., a reduction in local memory, an occurrence of a transaction ceiling, etc.). As described herein, POS terminal 122 may identify and load portions of the transaction, capacity, revenue, demand, and/or parameter-based target data from a locally stored memory (e.g., within data repository 126), and additionally or alternatively, may request and receive portions of the transaction, capacity, revenue, demand, and/or parameter-based target data from merchant system 140, e.g., across direct communications channel 120B. In other instances, merchant system 140 may perform operations that transmit portions of the stored transaction, capacity, revenue, demand, and/or parameter-based target data to content delivery system 160 across network 120.

Referring back to FIG. 1, device database 164 may include structured or unstructured data records identifying and characterizing one or more client devices operating within environment 100, such as client device 102, that participate in the exemplary processes described herein. In some aspects, device database 164 may maintain, for client device 102, data records that include, but are not limited to, a unique identifier of client device 102 (e.g., an IP address, a MAC address, etc.) and geo-location data specifying geographic positions of client device 102 (e.g., a latitude, longitude, or altitude) at corresponding times and/or dates. In some instances, client device 102 may be configured to transmit or "push" the determined geographic positions and corresponding times and/or dates across network 120 to content delivery system 160, which performs operations that store the determined geographic positions and corresponding times and/or dates within the one or more data records of device database 164.

In some aspects, customer database 166 may include structured or unstructured data records identifying and characterizing one or more customers of merchant 121, such as user 101. In some aspects, customer database 166 may maintain, for user 101, data records that include, but are not limited to, a unique identifier of user 101 (e.g., a name of user 101 or a login credential assigned to user 101), an address or telephone number of user 101, and a unique identifier of a device operated by or associated with user 101, such as an IP address or a MAC address of client device 102.

The data records associated with user 101 may also include user profile data that identifies and specifies one or more preferences of user 101 (e.g., a preference to purchase certain goods or services, or certain types of goods or services, from merchant 121), and data specifying one or more demographic characteristics of user 101, such as, but not limited to age, gender, educational level, occupation, income, residence, native, spoken, or preferred language, civil or marital status, or number of children. The data records associated with user 101 may further include data identifying an account of user 101 within one or more social media networks or microblogging services, such as, but not limited to, a Facebook™ account, a Twitter™ account, a LinkedIn™ account, a SnapChat™ account, and/or an Instagram™ account. Additionally, in some instances, the one or more data records associated with user 101 within customer database 166 may be linked, via the unique device identifier, to corresponding data records maintained by device database 164 on behalf of user 101 (e.g., which specify a time evolution in the geographic position of client device 102).

Content data store 168 may include elements of digital content (e.g., textual, graphical, and/or audible content) that, when distributed to one or more client devices operating within environment 100, facilitate an initiation of data exchanges involving merchant 121 (such as, but not limited to, those initiated at POS terminal 122 and other POS terminals associated with merchant 121). For example, the digital content elements may establish one or more promotional campaigns, each of which identify a promotion that incentives an initiation of a transaction to purchase a corresponding good or service from merchant 121. The promotion may, in some instances, correspond to a discount on any transaction initiated at merchant 121, or a discount on a particular good or service purchased from merchant 121, and the elements of digital advertising content may be associated with, or linked to, additional data (e.g., metadata) that identifies merchant 121 and/or POS terminal 122, and that characterizes one or more promotion parameters, such as, but not limited to, a type of the promotion (e.g., a discount), a promotion amount (e.g., a percentage, a discounted price, etc.), and a good or service involved in the promotion.

In some aspects, delivered content database 170 may include structured or unstructured data records identifying and characterizing one or more promotional campaigns, and corresponding elements of digital content, previously provisioned by content delivery system 160 to client devices operating within environment 100. For example, delivered content database 170 may maintain, for each of the previously delivered promotional campaigns, data records that uniquely identify the client devices selected to receive each of the promotional campaigns (e.g., IP addresses, MAC addresses, or other unique network identifiers), the provisioned digital content elements, and the corresponding promotions (e.g., an identifier of a corresponding merchant, such as merchant 121, data identifying a type or amount of an offered promotion, or data identifying a good or service involved in the promotion).

II. Exemplary Computer-Implemented Processes for Automatically Generating and Provisioning Notification Data to Dynamically Selected Network-Connected Devices In some embodiments, a computing system, such as content delivery system 160, may perform operations that receive data characterizing one or more first data exchanges during a first temporal interval, such as, but not limited to, first data exchanges initiated at a network-connected terminal device, e.g., POS terminal device 122 of FIG. 1 (and/or initiated at the one or more additional computing systems associated with the network-connected terminal device, e.g., merchant system 140). Content delivery system 160 may perform additional operations that store the received transaction data within one or more tangible non-transitory memories, e.g., within a portion of merchant database 162.

Figure 2A:
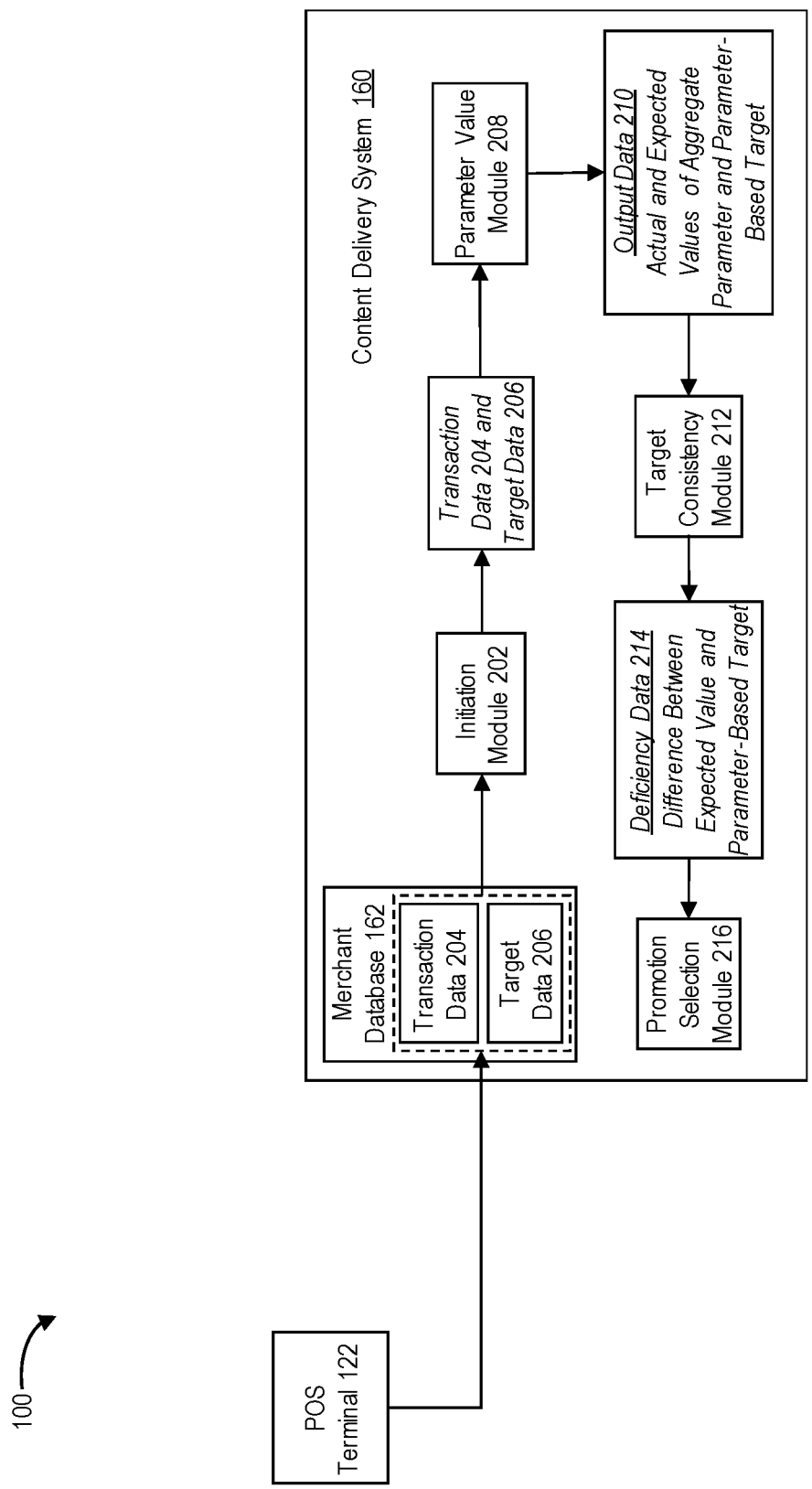
FIGS. 2A-2C are diagrams illustrating portions of an exemplary computing environment, consistent with the disclosed embodiments.

Referring to FIG. 2A, an initiation module 202 of content delivery system 160 may access a portion of stored data characterizing one or more transactions initiated at POS terminal 122 during a first temporal period, e.g., as maintained within transaction data 204 within merchant database 162. As described above, POS terminal 122 may be associated with, and operated by, a merchant, such as merchant 121, and the initiated transactions may correspond to purchases of a corresponding good or service from merchant 121 by a customer, such as user 101 that operates client device 102. Further, in some examples, each of the purchase transactions may be facilitated by an exchange of data initiated at POS terminal 122 by a corresponding client device operating within environment 100, such as client device 102.

In some aspects, transaction data 204 may specify, for each initiated transaction, a unique transaction identifier (e.g., as generated by POS terminal 122), a unique identifier of POS terminal 122 (e.g., an IP or MAC address), a unique identifier of the client device that initiated the purchase transaction (e.g., an IP or MAC address of client device 102), and values of one or more parameters that characterize the initiated transaction. Examples of these transaction parameter values include, but are not limited to, a transaction amount, an identifier of the good or service involved in the transaction (e.g., the assigned UPC), a quantity of the involved good or service, or a transaction date or time associated with the initiated transaction.

By way of example, merchant 121 may correspond to a bakery that, among other things, offers breakfast pastries and coffee for sale to customers during business hours (e.g., 6:00 a.m. to 4:00 p.m. daily) that include a breakfast shift (e.g., 6:00 a.m. to 11:00 a.m. daily), a lunch shift (e.g., 11:00 a.m. to 2:00 p.m. daily), and an afternoon shift (e.g., 2:00 p.m. to 4:00 p.m. daily), and POS terminal 122 may be disposed within a physical location of merchant 121. The accessed portion of transaction data 204 may, in some instances, include data characterizing purchases of breakfast pastries and coffee, as initiated by corresponding customers at POS terminal 122 during the breakfast shift (e.g., the first temporal interval). Further, in some examples, the accessed portion of transaction data 204 may also specify, for each initiated purchase transaction, the corresponding transaction amount, the identifier and/or quantity of the breakfast pastries or coffee, and the corresponding transaction date or time.

Referring back to FIG. 1, initiation module 202 may access an additional portion of stored data characterizing a parameter-based target established by merchant 121, e.g., parameter-based target data 206 within merchant database 162. In some aspects, as described herein, parameter-based target data 206 may identify and specify one or more parameter-based targets for transactions initiated during a second temporal interval (e.g., at POS terminal 122).

In some examples, as described herein, the second temporal interval may include the first temporal interval (e.g., the first temporal interval may include a portion of a business day, and the second temporal interval may include the entire business day). In other examples, consistent with the disclosed embodiments, the second temporal interval may include a future interval displaced temporally from the first temporal interval (e.g., the first temporal interval may correspond to a first business day, and the second temporal interval may correspond to a future, consecutive or non-consecutive business day).

Further, examples of the parameter-based target may include, but are not limited a revenue target (e.g., a specified amount of revenue during the second temporal interval, a specified rate of revenue generation or transaction initiation, or a desire to maximize revenue during the second temporal interval) or a capacity target (e.g., a specified reduction in the available inventory of a particular good or service during the second temporal interval, a desire to sell an entire quantity of the available inventory of the particular good or service during the second temporal interval, or a desire to sell a particular number of units per hour or other temporal interval). The disclosed embodiments are not limited to these examples of revenue or capacity targets, and in other aspects, parameter-based target data 206 may specify any additional or alternate revenue, inventory, or other target appropriate to merchant 121 and consistent with transaction data 204.

As illustrated in FIG. 2A, initiation module 202 may provide transaction data 204 and parameter-based target data 206 as an input to a parameter value module 208 of content delivery system 160. In some aspects, as described herein, parameter value module 208 may process portions of parameter-based target data 206 to identify the parameter-based target established by merchant 121, such as, but not limited to the revenue or capacity targets described above. Parameter value module 208 may further identify an aggregate parameter that characterizes the transactions initiated during the first temporal interval (e.g., as specified within transaction data 204) and further, that is consistent with the parameter-based target established by merchant 121.

For example, when the parameter-based target corresponds to a revenue target (e.g., a specified amount of revenue), parameter value module 208 may characterize the transactions initiated during the first temporal interval using an aggregate revenue target, such as a total revenue derived from the transactions initiated during first temporal interval. In other instances, when the parameter-based target corresponds to a capacity target (e.g., a specified reduction in the inventory of a particular good or service maintained by merchant 121), parameter value module 208 may characterize the transactions initiated during the first temporal interval using an aggregate capacity target, such as a total number of units of the particular good or service involved in the transactions initiated during first temporal interval.

In some aspects, parameter value module 208 may process portions of transaction data 204 to compute an actual value of the aggregate parameter during the first temporal interval. In one instance, parameter value module 208 may also compute an expected value of the aggregate parameter during the second temporal interval based on an application of one or more extrapolation algorithms to the actual value of the aggregate parameter during the first temporal interval and additionally or alternatively, based on actual values of the aggregate parameter during one or more prior temporal intervals. Examples of these extrapolation algorithms include, but are not limited to, linear extrapolation schemes, polynomial extrapolation schemes (e.g., based on polynomial coefficients generated through Lagrange interpolation), non-linear extrapolation schemes specific to particular distributions of the actual values of the aggregate parameters.

In additional instances, parameter value module 208 may compute an expected value of the aggregate parameter during the second temporal interval based on an application of one or more predictive models to the actual value of the aggregate parameter during the first temporal interval and to the actual values of the aggregate parameter during one or more prior temporal intervals. For example, these predictive models may apply one or more statistical algorithms or models to the actual value of the aggregate parameter during the first and the one or more prior temporal intervals to identify and specify corresponding patterns or trends in the actual values of the aggregate parameters across these temporal intervals, and to predict the expected value of the aggregate parameter during the second temporal interval based on, and in accordance with, these identified and specified patterns.

In other examples, the predictive models may incorporate one or more machine learning algorithms or artificial intelligence algorithms, and parameter value module 208 may compute the expected value of the aggregate parameter during the second temporal interval based an application of these machine learning algorithms or artificial intelligence algorithms to the actual value of the aggregate parameter during the first temporal interval and additionally or alternatively, to the actual values of the aggregate parameter during the one or more prior temporal intervals (not illustrated in FIG. 2A). The machine learning algorithms and/or the artificial intelligence algorithms may, in some instances, be trained against, and adaptively improved using, expected values of the aggregate parameter computed during prior temporal intervals and actual values of the aggregate parameter determined from transaction data collected during these prior temporal intervals.

By way of example, transaction data 204 may include data characterizing purchased transactions initiated at POS terminal 122 during a breakfast shift at the bakery, e.g., purchase transactions initiated between 6:00 a.m. and 11:00 a.m. on a corresponding business day (e.g., the first temporal interval), and parameter-based target data 206 may identify a revenue target established by the bakery for each business day, such as a total revenue of $2,000 aggregated across the breakfast, lunch, and afternoon shifts (e.g., the second temporal interval). In some aspects, parameter value module 208 may perform operations that establish a total revenue as the aggregate parameter, and that compute an actual revenue of $1,150 derived from transactions initiated at POS terminal 122 during the breakfast shift of the bakery (e.g., based on portions of transaction data 204). Further, parameter value module 208 may perform any of the exemplary processes described herein to compute an expected total revenue of $1,850 during the business day (e.g., include the actual revenue of $1,150 during the breakfast shift and predict additional revenue of $700 during the lunch and afternoon shifts).

In some aspects, illustrated in FIG. 2A, parameter value module 208 may perform operations that store the actual value of the aggregated parameter during the first temporal interval, the expected value of the aggregated parameter during the second temporal interval, and the parameter-based target within one or more portions of a tangible, non-transitory memory, e.g., within merchant database 162. Further, parameter value module 208 may package the actual value of the aggregated parameter during the first temporal interval, the expected value of the aggregated parameter during the second temporal interval, and the identified parameter-based target into output data 210, which parameter value determination may provide as an input to a target consistency module 212 of content delivery system 160.

Target consistency module 212 may process output data 210 to obtain local copies of the expected value of the aggregated parameter during the second temporal interval and the parameter-based target, and may perform operations that determine whether the expected value of the aggregate parameter during the second temporal interval is consistent with the parameter-based target. For example, when the expected value of the aggregate parameter is equivalent to or exceeds the parameter-based target, target consistency module 212 may determine that a promotional campaign is unnecessary to meet the parameter-based target during the second temporal interval. Content delivery system 160 may discard output data 210 and repeat a performance of these exemplary processes in response to a detected expiration of the second temporal interval or a detection of an additional or alternate revenue or capacity target specified by merchant 121.

Alternatively, when the expected value of the aggregate parameter fails to exceed the parameter-based target, target consistency module 212 may determine that an automatic generation and provisioning of a promotional campaign may facilitate a satisfaction of the parameter-based target during the second temporal interval. In some aspects, target consistency module 212 may compute a difference between the established parameter-based target and the expected value of the aggregate parameter during the second temporal interval. Target consistency module 212 may perform additional operations that package the computed difference, along with the actual value of the aggregate parameter during the first temporal interval, the expected value of the aggregate parameter during the second temporal interval, and/or the parameter-based target, into deficiency data 214.

For example, and as described herein, merchant 121, e.g., the bakery, may establish a revenue target of $2,000 for transactions initiated at POS terminal 122 during a corresponding business day (e.g., the second temporal interval), and may receive data specifying $1,850 in expected revenue derived from transactions initiated at POS terminal 122 during the corresponding business day. As described herein, target consistency module 212 may establish that the expected revenue of $1,850 fails to equal or exceed the target revenue of $2,000 for the corresponding business day, and may output deficiency data 214. Deficiency data 214 may, for example, identify the $150 difference between the expected and target revenue, along with the $1,150 in actual revenue derived from the transactions initiated during the first temporal interval (e.g., the breakfast shift of the bakery), the $1,850 in expected revenue during the second temporal interval (e.g., the corresponding business day), and the $2,000 revenue target established by merchant 121.

In some aspects, target consistency module 212 may provide deficiency data 214 as an input to a promotion selection module 216. As described below in reference to FIG. 2B, promotion selection module 216 may perform any of the exemplary processes described herein to determine an amount of merchant inventory available during the second temporal interval (e.g., an "excess capacity" of merchant 121) and to compute expected outcome data that characterizes an expected outcome of one or more available promotion campaigns provisioned to one or more client devices during the second temporal interval. Promotion selection module 216 may, in some aspects, perform additional operations that identify a subset of the available promotions that are feasible for delivery during the second temporal interval based on the expected outcome data and the determined excess capacity, and select a corresponding one of the feasible promotional campaigns for delivery based on the expected outcome data and the parameter-based target established by merchant 121, as described below in reference to FIG. 2B.

Figure 2B:
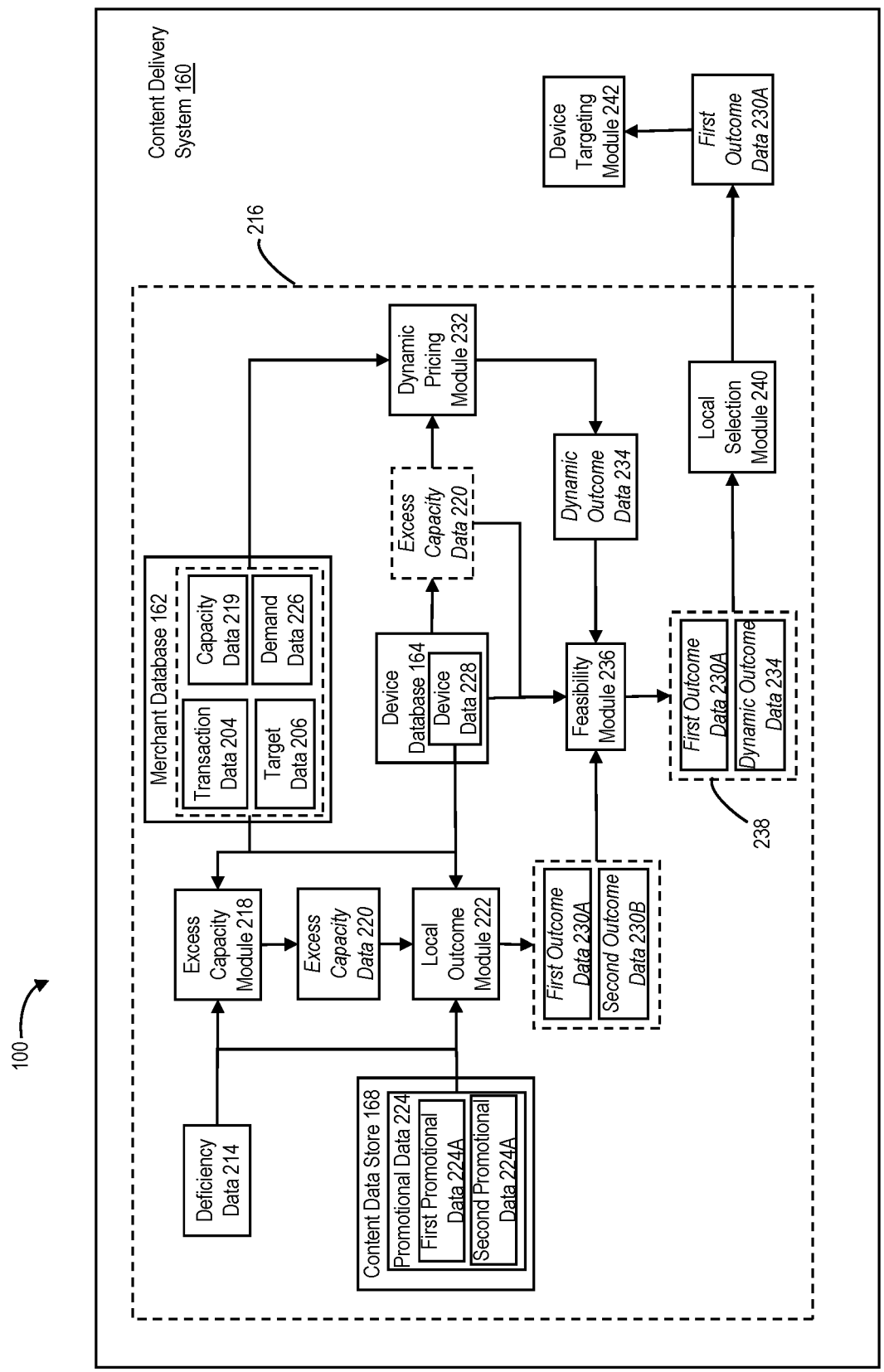

Referring to FIG. 2B, promotion selection module 216 may receive deficiency data 214. Promotion selection module 216 may also perform operations that extract and store the computed difference between the parameter-based target and the expected values of the aggregate parameter value during the second temporal interval (e.g., the $150 difference between the expected and target revenue), the actual value of the aggregate parameter during the first temporal interval (e.g., the $1,150 in actual revenue), the expected value of the aggregate parameter during the second temporal interval (e.g., the $1,850 in expected revenue), the parameter-based target (e.g., the $2,000 revenue target) within one or more tangible, non-transitory memories.

Responsive to the receipt of deficiency data 214, an excess capacity module 218 of promotion selection module 216 my access stored data indicative of an amount or type of merchant inventory available for sale during the second temporal interval, e.g., capacity data 219 of merchant database 162. In some instances, the accessed data may specify a quantity of goods or services (e.g., an "excess" capacity) available for sale during the second temporal interval, e.g., through transactions initiated at POS terminal 122 by client device 102. For example, after a conclusion of the breakfast shift at the bakery (e.g., the first temporal interval at merchant 121), capacity data 219 may indicate that thirty individual breakfast pastries are available for purchase during the remainder of the bakery's business day (e.g., the second temporal interval), while an unlimited amount of coffee remains available for purchase throughout the business day. As described in FIG. 2B, excess capacity module 218 may access and load portions of capacity data 219 that characterize the available quantity of the particular goods or services and the unit prices of these available goods or services, e.g., excess capacity data 220, and may provide excess capacity data 220 as an input to a local outcome module 222 of promotion selection module 216.

Local outcome module 222 may receive excess capacity data 220 and deficiency data 214, and may perform additional operations that access and load, from the one or more tangible, non-transitory memories (e.g., from content data store 168), promotional data 224 that identifies and specifies one or more promotional campaigns, each of which may be associated with corresponding elements of digital content. As described herein, the elements of digital content that establish each of the promotional campaigns may be associated with, and specify, a corresponding promotion, such as a discount on a purchase transaction initiated at merchant 121, and the elements of digital content may include, but are not limited to, textual content, graphical content, video content, or audible content. Further, promotional data 224 may include, for each promotional campaign, parameter data (e.g., metadata) that identifies merchant 121 and/or POS terminal 122, and that characterizes one or more parameters of the promotion, such as, but not limited to, a type of the promotion (e.g., a discount), a promotion amount (e.g., a percentage, a specified monetary amount), and a good or service involved in the promotion.

In some aspects, local outcome module 222 may process promotional data 224 and deficiency data 214, and determine a predicted outcome associated with each of the one or more promotional campaigns, and further, one or more implementation-specific characteristics that facilitate each of the predicted outcomes. By way of example, local outcome module 222 may determine the predicted outcome, and the one or more implementation-specific characteristics, based on portions of deficiency data 214 and promotional data 224, either alone or in conjunction with portions of excess capacity data 220, demand data 226 (e.g., as maintained within merchant database 162), and/or device data 228 (e.g., as maintained within device database 164).

The predicted outcome for a corresponding one of the promotional campaigns may, for example, identify an expected number of additional transactions initiated at POS terminal 122 during the second temporal interval as a result of the corresponding promotional campaign and further, an impact of these additional initiated transactions on the expected value of the aggregate parameter during the second temporal interval. Further, examples of the implementation-specific characteristics of each promotional campaign may include, but are not limited to, a promotional value (e.g., a percentage discount or a financial discount), a good or service associated with the promotion, a number of client devices that initiate transactions at POS terminal 122 in response to the promotional campaign, or a period of validity of the promotional campaign. In some instances, local outcome module 222 may establish or modify portions of the implementation-specific characteristics for a particular promotional campaign based on portions of promotional data 224, or in accordance with the revenue or capacity target established by merchant 121.

By way of example, and as described herein, merchant 121 may correspond to the bakery that established a target revenue of $2,000 for a corresponding business day (e.g., the second temporal interval). As further described herein, and based on portions of deficiency data 214, local outcome module 222 may establish an actual revenue of $1,150 during the breakfast shift (e.g., the first temporal interval), expected revenue of $1,850 during the corresponding business day, and a difference of $150 between the target and expected revenue. Further, and based on excess capacity data 220, local outcome module 222 may establish that thirty individual breakfast pastries are available for purchase during the remainder of the bakery's business day (e.g., the second temporal interval), and an unlimited amount of coffee remains available for purchase throughout the business day.

In further examples, promotional data 224 (e.g., as loaded from content data store 168) may include first promotional data 224A, which characterizes a first promotional campaign associated with the bakery, and second promotional data 224B, which characterizes a second promotional campaign associated with the bakery. Local outcome module 222 may also access and load, from merchant database 162, demand data 226 that identifies and characterizes an actual or forecasted demand for goods or services offered for sale by the bakery (e.g., which specifies a demand for a quantity of a good or service as a function of unit price). Further, local outcome module 222 may access and load, from device database 164, device data 228 that identifies, among other things, a number of client devices (e.g., client device 102) that operate within environment 100 and additionally or alternatively, are disposed within a threshold distance of a geo-location of POS terminal 122 (e.g., and as "proximate" to a geo-location of merchant 121).

For example, first promotional data 224A may include one or more elements of digital content, and the implementation-specific characteristics specified within first promotional data 224A may establish a first promotion, e.g., a discount of 25% on any purchase from the bakery during portions of the second temporal interval, such as the lunch and afternoon shifts described herein. In some aspects, local outcome module 222 may access excess capacity data 220, extract an available capacity at the bakery (e.g., thirty breakfast pastries and unlimited coffee) and corresponding unit prices (e.g., $4.00 per breakfast pasty and $3.00 per cup of coffee), and apply the established 25% discount to the corresponding unit prices (e.g., to establish a discounted price of $3.00 per breakfast pastry and $2.25 per cup of coffee).

In some instances, local outcome module 222 may determine a predicted outcome of the first promotion based on the available capacity at the bakery (e.g., thirty breakfast pastries and unlimited coffee) and the discounted unit prices (e.g., $3.00 per breakfast pastry and $2.25 per cup of coffee), in conjunction with portions of demand data 226 and/or device data 228. For example, local outcome module 222 may apply one or more analytical, statistical, or predictive processes (e.g., one or more of those described above) to the available capacity, the discounted unit prices, and the portions of demand data 226 and/or device data 228 to establish an increase in customer demand for both breakfast pastries and coffee due to the 25% discount, and to predict a sale of at least an additional twenty-three breakfast pastries and forty-five cups of coffee during the second temporal interval.

The increased sales of breakfast pastries and coffee during the second temporal interval may result in an additional $182.25 in revenue (e.g., based on the discounted unit prices), which may increase the expected revenue for the second temporal interval from $1,850 to $2,032.25. In aspects, local outcome module 222 may package a merchant identifier (e.g., the name of the bakery) and first promotional data 224A (e.g., which includes elements of digital content associated with the first promotion) into first outcome data 230A. Local outcome module 222 may also include, within first outcome data 230A, additional data characterizing an expected change in merchant capacity resulting from the first promotion, (e.g., the sale of the additional twenty-three breakfast pastries and forty-five cups of coffee by the bakery), the additional revenue derived from the first promotion (e.g., the additional $182.25 in revenue), and the change in the expected value of the aggregate parameter during the second temporal interval (e.g., the $2,032.25 in expected revenue during the corresponding business date).

In other examples, second promotional data 224B may also include one or more elements of digital content, and the implementation-specific characteristics specified within second promotional data 224B may establish a second promotion, e.g., a reduction in the unit price of breakfast pastries from $4.00 to $1.00 and a reduction in the unit price of coffee from $3.00 to $0.75 during portions of the second temporal interval, such as the lunch and afternoon shifts described herein. In some instances, local outcome module 222 may determine a predicted outcome of the second promotion based on the available capacity at the bakery (e.g., thirty breakfast pastries and unlimited coffee) and the discounted unit prices (e.g., $1.00 per breakfast pastry and $0.75 per cup of coffee), in conjunction with portions of demand data 226 and/or device data 228. For example, local outcome module 222 may apply one or more the analytical, statistical, or predictive processes (e.g., one or more of those described above) to the available capacity, the discounted unit prices, and the portions of demand data 226 and/or device data 228 to establish an increase in customer demand for both breakfast pastries and coffee due to the reduction in price, and to predict a sale of at least all thirty remaining breakfast pastries and seventy-five cups of coffee during the second temporal interval.

The increased sales of breakfast pastries and coffee during the second temporal interval may result in an additional $86.25 in revenue (e.g., based on the discounted unit prices), which may increase the expected revenue for the second temporal interval from $1,850 to $1,936.25. In aspects, local outcome module 222 may package the merchant identifier and second promotional data 224B (e.g., which includes the elements of digital content associated with the second promotion) into second outcome data 230B. Local outcome module 222 may also incorporate, within second outcome data 230B, additional data characterizing an expected change in merchant capacity resulting from the second promotion, (e.g., the sale of all thirty breakfast pastries and seventy-five cups of coffee by the bakery), the additional revenue derived from the second promotion (e.g., the additional $86.25 in revenue), and the change in the expected value of the aggregate parameter during the second temporal interval (e.g., the $1,936.25 in expected revenue during the corresponding business day).

In some examples, described herein, the implementation-specific characteristics that establish each of the promotional campaigns, e.g., the percentage discount and/or the discounted unit price, may be fixed by merchant 121 (e.g., the bakery) and may remain unchanged by promotion selection module 216 or local outcome module 222. In other examples, described herein, a dynamic pricing module 232 of promotion selection module 216 may perform operations that selectively and dynamically modify one or more of the implementation-specific characteristics of a promotional campaign to facilitate an increase in an expected value of an aggregate parameter during the second temporal interval, and to maintain a consistency between the expected value and a target value of the aggregate parameter specified by merchant 121.

As illustrated in FIG. 2B, dynamic pricing module 232 may access second promotional data 224B (e.g., which specifies the discounted price of $1.00 per breakfast pastry and $0.75 per cup of coffee associated with the second promotion). Based on second promotional data 224B, and based the available capacity at the bakery (e.g., thirty breakfast pastries and unlimited coffee) in conjunction with portions of demand data 226 and/or device data 228, dynamic pricing module 232 may perform operations that dynamically modify the discounted prices of the breakfast pastries and/or the coffee such that an expected revenue derived from additional transactions during the second temporal interval is consistent with, or exceeds, a target revenue during the second temporal interval, e.g., as specified by the bakery.

In some examples, and based on an application of one or more analytical, statistical, or predictive processes (e.g., one or more of those described above) to the available capacity, the established unit prices, and the portions of demand data 226 and/or device data 228, dynamic pricing module 232 may determine to increase the discounted unit price of the breakfast pastries from $1.00 to $2.25, and to increase the discounted unit price of the coffee from $0.75 to $1.50. The dynamic modification (e.g., the increases) in the discounted unit prices may result in a sale of all thirty remaining breakfast pastries and fifty-five cups of coffee during the second temporal interval, and may be customized to result in an additional $150.00 in revenue during the second temporal interval (e.g., based on the increases to the discounted unit prices), which increases the expected revenue for the second temporal interval to the target revenue of $2,000. In aspects, dynamic pricing module 232 may package the merchant identifier and portions of second promotional data 224B, as modified herein (e.g., which includes the elements of digital content associated with the second promotion and the modified discounted unit prices), into dynamic outcome data 234. Dynamic pricing module 232 may also incorporate, within dynamic outcome data 234, additional data characterizing an expected change in merchant capacity, (e.g., the sale of all thirty breakfast pastries and fifty-five cups of coffee by the bakery), the additional $150.00 in revenue, and the change in the expected value of the aggregate parameter during the second temporal interval (e.g., the $2,000.00 in expected revenue during the corresponding business date).

As illustrated in FIG. 2B, a feasibility module 236 of promotion selection module 216 may receive, as inputs, first outcome data 230A and second outcome data 230B from local outcome module 222, and dynamic outcome data 234 from dynamic pricing module 232. In some aspects, as described herein, feasibility module 236 may perform operation that establish a feasibility of the promotional campaigns specified by first outcome data 230A, second outcome data 230B, and dynamic outcome data 234 for implementation by merchant 121 and by the one or more client devices operating within environment 100 during the second temporal interval.

By way of example, feasibility module 236 may access excess capacity data 220 and establish a quantity of goods and services available for sale by merchant 121. Feasibility module 236 may also access device data 228 and establish a number of client devices operating within environment 100, and additionally or alternatively, a number of the client devices disposed within a threshold distance of POS terminal 122 (e.g., 100 meters, 500 meters, etc.). In some aspects, feasibility module 236 may perform operations that determine whether the promotion campaigns by first outcome data 230A, second outcome data 230B, and dynamic outcome data 234 are feasible for implementation in view of the quantity of quantity of goods and services available for sale by merchant 121 and/or the number of client devices available to initiate transactions at POS terminal 122 during the second temporal interval.

For instance, and as described above, feasibility module 236 may establish that merchant 121, e.g., the bakery, maintains an available inventory of thirty breakfast pastries and an unlimited inventory of coffee, and further, may establish that sixty client devices, including client device 102, are operating within environment 100 and disposed proximate to POS terminal 122. In one example, feasibility module 236 may establish that the promotional campaigns specified by first outcome data 230A and dynamic outcome data 234 (e.g., which, during the second temporal interval, result in respective sales of twenty-seven additional breakfast pastries and forty-five cups of coffee, and thirty additional breakfast pastries and fifty-five cups of coffee) are consistent with and feasible in view of the available inventory of the bakery and the sixty proximate client devices.

In other examples, however, feasibility module 236 may establish that the promotional campaign specified by second outcome data 230B (e.g., which, during the second temporal interval, result in a sale of thirty additional breakfast pastries and seventy-five cups of coffee) is consistent with the available inventory of the bakery, but may not be feasibly implemented in view of the sixty proximate client devices. Feasibility module 236 may perform operations that deem the second promotional campaign infeasible for implementation within environment 100.

Further, in some aspects, feasibility module 236 may perform additional operations that establish a feasibility of one or more promotional campaigns based on a determined compliance with one or more promotional rules. Examples of these promotional rules include, but are not limited to, a specified floor on any discounted price (e.g., a floor of $1.00) or a specified ceiling on any percentage discount (e.g., a ceiling of 75%). In some instances, feasibility module 236 may apply the one or more promotional rules to the second promotional campaign specified by second outcome data 230B, and may determine that the second promotional campaign fails to comply with these promotional rules because of the discounted unit price of coffee, e.g., $0.75, falls below the specified flow of $1.00. Feasibility module 236 may perform additional operations that deem the second promotional campaign infeasible for implementation within environment 100. The disclosed embodiments are, however, not limited to these exemplary metrics of feasibility, and in other aspects, feasibility module 236 may establish the feasibility of a promotional campaign based on any additional or alternate metric appropriate to content delivery system 160, client device 102, and merchant 121.

Referring back to FIG. 2B, feasibility module 236 may perform operations that package data charactering those promotional campaigns deemed feasible for implementation within environment 100 (e.g., first outcome data 230A and dynamic outcome data 234) into feasible outcome data 238, which feasibility module 236 may provide to a local selection module 240. In some aspects, local selection module 240 may parse feasible outcome data 238 and identify, for each feasible promotional campaign, the resulting change in the expected value of the aggregate parameter during the second temporal interval. Local selection module 240 may perform additional operations that select, for delivery to the one or more client devices operating within environment 100, the feasible promotion campaign that results in a change in the change in the expected value of the aggregate parameter that exceeds, or best approximates, the target value of the aggregate parameter during the second temporal interval, e.g., as established by merchant 121.

For example, based on first outcome data 230A, local selection module 240 may determine that the first promotion campaign facilitates additional transactions that result in an expected revenue of $2,032.25 during the second temporal interval (e.g., the business day), and sales of an additional twenty-seven breakfast pastries and forty-five cups of coffee. Further, local selection module 240 may also determine that the promotion campaign associated with dynamic outcome data 234 facilitates additional transactions that result in an expected revenue of $2,000.00 during the second temporal interval (e.g., the business day), and sales of an additional thirty breakfast pastries and fifty-five cups of coffee.

In one aspect, local selection module 240 may determine that $2,032.25 expected revenue, as derived from the first promotional campaign, not only meets but also exceeds the $2,000.00 revenue target established by the bakery for the second temporal interval. Responsive to this determination, local selection module 240 may perform operations that select the first promotional campaign for delivery to the one or more client devices within environment 100, and may provide first outcome data 230A as an input to a device targeting module 242 of content delivery system 160.

In other aspects (not illustrated in FIG. 2B), local selection module 240 may determine that $2,032.25 expected revenue, as derived from the promotional campaign associated with dynamic outcome data 234, meets the $2,000.00 revenue target established by the bakery for the second temporal interval, and further, consumes an entire inventory of breakfast pastries maintained by the bakery during the second temporal interval. Responsive to this determination, local selection module 240 may perform operations that select the promotional campaign associated with dynamic outcome data 234 for delivery to the one or more client devices within environment 100, and may provide dynamic outcome data 234 as an input to device targeting module 242 of content delivery system 160. The disclosed embodiments are, however, not limited to these exemplary selection criteria, and in other aspects, local selection module 240 may perform operations that select one or more promotional campaigns for delivery to the one or more client devices based on any additional or alternate selection criteria appropriate to content delivery system 160, client device 102, or POS terminal 122.

Figure 2C:
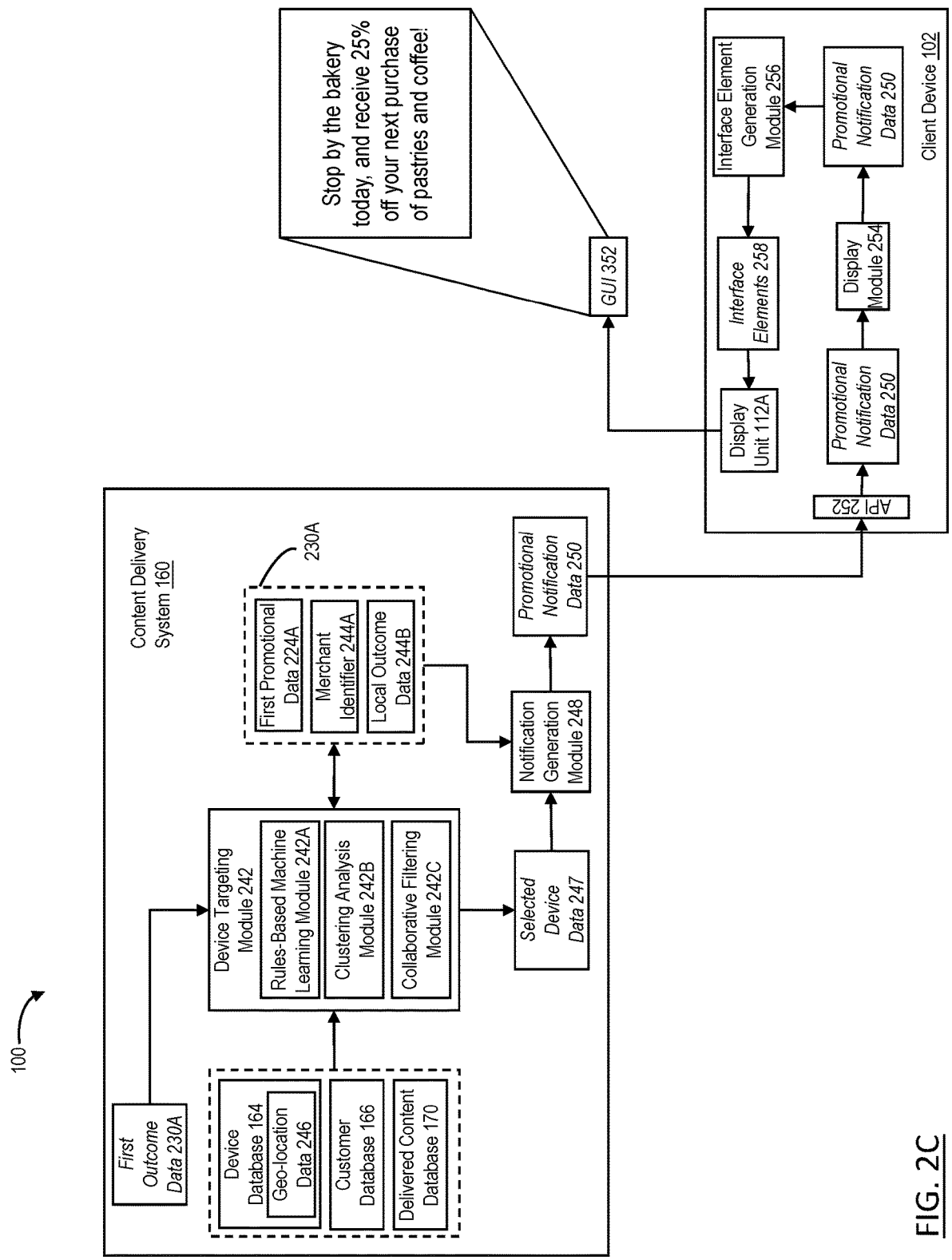

Referring to FIG. 2C, device targeting module 242 may receive first outcome data 230A (e.g., which confirms the selection of the first promotional campaign for delivery to the one or more client devices), and may perform operations that store first outcome data 230A within one or more tangible, non-transitory memories. For example, and as described herein, the first promotional campaign may provide a customer of merchant 121, e.g., the bakery, with a discount of 25% on any purchase transaction initiated during portions of the second temporal interval, such as the lunch and afternoon shifts of the corresponding business day. Further, and as illustrated in FIG. 2C, locally stored first outcome data 230A (e.g., as maintained within the one or more tangible, non-transitory memories) may include first promotional data 224A, which specifies the 25% discount and the elements of digital content associated with the first promotional campaign, an identifier 244A of merchant 121 (e.g., the bakery name), and local outcome data 244B characterizing an expected change in merchant capacity resulting from the first promotion, the additional revenue derived from the first promotion, and the change in the expected value of the aggregate parameter during the second temporal interval, as described above.

In some aspects, device targeting module 242 may perform operations that identify one or more client devices that are disposed proximate to a geo-location of merchant 121 within a corresponding geographic region. For example, device targeting module 242 may access and load, from device database 164, geo-location data 246 that identifies one or more client devices operating within environment 100 (e.g., through an IP address, MAC address, or other unique network identifier), and specifies a time evolution of a geo-location of these client devices (e.g., by associating a latitude, longitude, or altitude within a corresponding time stamp). Device targeting module 242 process the geo-location data 246 and identify those client devices, including client device 102, that are disposed within a corresponding threshold distance of the geo-location of merchant 121 (e.g., within 50 meters, 100 meters, etc., or within a specified geo-fenced region, such as a shopping mall, that includes merchant 121). The geo-location of merchant 121 may, in some examples, correspond to a geo-location of POS terminal 122. In other examples, content delivery system 160 may store the geo-location assigned to merchant 121 within one or more locally accessible memories.

Device targeting module 242 may perform additional processes that determine a particular number of the proximate client devices that should be targeted with the first promotional campaign, e.g., a "targeted" number of proximate client devices. The targeted number of the proximate client devices may, for example, be sufficient to, and capable of, initiating transactions involving merchant 121 (e.g., at POS terminal 122) during the second temporal interval that yield the expected additional revenue associated with the first promotional campaign (e.g., the additional $182.25 in revenue). In some aspects, device targeting module 242 may access local outcome data 244B and perform operations that determine the targeted number of client devices based on the expected change in merchant capacity resulting from the first promotion. In other aspects, the targeted number of client devices may be specified as part of first outcome data 230A (e.g., as an output of the analytical, statistical, or predictive processes performed by promotion selection module 216), and device targeting module 242 may access and load data specifying the targeted number of client devices from a portion of stored local outcome data 244B.

Further, in additional or alternate aspects, device targeting module 242 may determine the target number of client devices based on numbers of client devices targeted during a dynamic generation and targeted distribution of similar promotional campaigns. In some examples, device targeting module 242 may access and load, from stored local outcome data 244B, information that characterizes the expected change in merchant capacity resulting from the first promotion, e.g., the expected additional purchases of twenty-seven breakfast pastries and forty-five cups of coffee during the lunch and afternoon shifts during the corresponding business day of the bakery.

Device targeting module 242 may also access portions of delivered content database 170, identify data characterizing one or more prior promotional campaigns of merchant 121 (e.g., the bakery) that facilitate similar changes in merchant capacity (e.g., the twenty-seven breakfast pastries and forty-five cups of coffee), and load data specifying the numbers of client devices targeted during each of the prior, similar promotional campaigns. Device targeting module 242 may perform additional operations that determine the targeted number of proximate client devices for the first promotional campaign based on an analysis of the numbers of client devices targeted during each of the prior promotional campaigns, e.g., based on a statistical analysis or on correlations established between the numbers of previously targeted devices and the changes in merchant capacity associated with the prior promotional campaigns.

Device targeting module 242 may perform additional operations that select a subset of the proximate client devices (e.g., client device 102) to receive notification data consistent with the first promotional campaign. In some instances, the selected subset of the proximate client devices may include at least the targeted number of proximate client devices, and device targeting module 242 may determine that the customers operating the selected subset of the proximate client devices (e.g., user 101 that operates client device 102) are likely receptive to the first promotional campaign, and are likely to initiate a purchase transaction involving merchant 121 (e.g., at POS terminal 122) in response to the first promotional campaign.

In one aspect, device targeting module 242 may select the subset of the proximate client devices based on corresponding customer profile data maintained by content delivery system 160, e.g., within customer database 166. For example, device targeting module 242 may perform operations that identify the unique identifiers of each of the proximate client devices (e.g., the IP address, MAC address, or other unique identifier of client device 102), access customer database 166, and identify one or more records that include corresponding ones of the unique identifiers of the proximate client devices. Device targeting module 242 may load customer profile data from each of the identified data records, and determine whether to select the corresponding client device to receive the notification data consistent with the first promotional campaign based on portions of the customer profile data.

For example, the customer profile data associated with user 101 (e.g., that operated client device 102) may specify one or more product-based or merchant-based preferences of user 101. In some aspects, the merchant-based preferences may identify an interest of user 101 in merchant 121, e.g., the bakery, or the product-based preferences may identify an interest of user 101 in one or more goods or services offered for sale by merchant 121, such as the breakfast pastries or coffee offered for sale by the bakery. Based on these merchant- or product-based preferences, which establish user 101's interest in merchant 121 or the goods or services offered for sale by merchant 121, device targeting module 242 may select client device 102 to receive the first promotional campaign, and generate selected device data 247 that includes the unique network identifier of client device 102. Device targeting module 242 may apply similar profile-based selection processes to each additional or alternate one of the identified proximate client devices.

In other instances, a rule-based machine learning module 242A of device targeting module 242 may select at least a portion of the subset of the proximate client based on an application of one or more rule-based machine learning algorithms, such as an association-rule algorithm (e.g., an Apriori algorithm, an Eclat algorithm, or an FP-growth algorithm), to stored data characterizing one or more potential customers of merchant 121, e.g., customer database 166. The application of these association-rule algorithms may generate and output one or more association rules that link the purchase of a good or service from merchant 121 during the second temporal interval (e.g., the purchase of a breakfast pastry or coffee from the bakery) with other customer purchases, preferences, and/or demographic characteristics. In some aspects, rule-based machine learning module 242A may process portions of customer database 166 to identify occurrences of the one or more association rules within data records associated with corresponding customers, and to output the unique network identifiers of proximate client devices operated by these corresponding customers to device targeting module 242, which may perform operations that package the unique network identifiers into selected device data 247.

Additionally, in some instances, a clustering analysis module 242B of device targeting module 242 may select at least a portion of the subset of the proximate client devices based on an application of one or more clustering algorithms, such as a hierarchical clustering module, a k-means algorithm, or other statistical clustering algorithms, to portions of customer database 166 that characterize one or more potential customers of merchant 121. For example, and based on an application of the k-means algorithm to portions of customer database 166, clustering analysis module 242B may identify clusters of similar customers (e.g., that exhibit demographic, profile-based, or other similarities, such as similar social media activity or similar purchases), and may establish that one or more of the clusters of similar customers may be amenable to merchant 121 (e.g., the bakery) or to purchases from merchant 121 (e.g., the breakfast pastries or coffee).

Clustering analysis module 242B may output data identifying these established clusters of similar customers to device targeting module 242, which may perform operations that identify similar customers that operate one or more of the proximate client devices (e.g., based on unique network identifiers included within the data records of customer database 166). Device targeting module 242 may extract the unique network identifiers of these one or more proximate client devices from customer database 166 (e.g., an IP address, a MAC address, or other network identifier), and package the unique network identifiers into selected device data 247.

In further instances, a collaborative filtering module 242C of device targeting module 242 may select at least a portion of the subset of the proximate client devices based on an application of one or more collaborative filtering algorithms, such as memory- or model-based algorithms, to portions customer database 166 that characterize one or more potential customers of merchant 121. For example, using any of the exemplary processes described herein, device targeting module 242 may establish a likelihood that user 101 (e.g., which operates client device 102) will be receptive to the first promotional campaign and in response to the first promotional campaign, is likely to initiate a purchase transaction at POS terminal 122 during the second temporal interval. Collaborative filtering module 242C may identify, based on portions of customer database 166, one or more additional customers that share demographic characteristics or certain preferences with user 101, and output the unique network identifiers of client devices operated by these one or more additional customers (e.g., as maintained within one or more data records of customer database 166) to device targeting module 242. As described herein, device targeting module 242 may package the unique network identifiers into portions of selected device data 247.

The disclosed embodiments are not limited to these examples of device targeting processes, which leverage customer profiles, rules-based machine learning processes, clustering analysis, or collaborative filtering. In other aspects, device targeting module 242 may select the subset of proximate client devices that receive notification data consistent with the first promotional campaign based on an application of any additional or alternate analytical process, machine-learning process, or statistical technique to portions of customer database 166, and to other stored data maintained by or locally accessible to, content delivery system 160.

Referring back to FIG. 2C, device targeting module 242 may provide selected device data 247, which includes the unique network identifiers of the proximate client devices selected to receive the first promotional campaign, as an input to a notification generation module 248 of a content delivery system 160. Notification generation module 248 may also access the one or more tangible, non-transitory memories and load first promotional data 224A, which includes the one or more elements of digital content associated with the first promotional campaign. Notification generation module 248 may package portions of first promotional data 224A into corresponding promotional notification data 250, which notification generation module 248 may transmit across network 120 to the unique network address of each of the selected proximate client devices, including client device 102, through corresponding programmatic interfaces.

For example, a programmatic interface established and maintained by client device 102, such as application programming interface (API) 252, may receive promotional notification data 250 from content delivery system 160. By way of example, API 252 may be associated with, and established and maintained by a display module 254 of client device 102, and may facilitate direct, module-to-module communications between notification generation module 248 of content delivery system 160 and display module 254. API 252 may provide promotional notification data 250 as an input to display module 254 executed by client device 102.

By way of example, display module 254 may be associated with one or more application programs executed by client device 102, such as the payment application described herein, and display module 254 may be configured to provide promotional notification data 250 as an input to an interface element generation module 256, which may process promotional notification data 250 to generate one or more interface elements 258 that reflect the elements of digital content associated with the first promotional campaign, e.g., the 25% discount on all purchases from the bakery during the lunch and afternoon shifts of the corresponding business day. In some aspects, interface element generation module 256 may provide interface elements 258 to display unit 112A, which may present interface elements 258 to user 101 within a graphical user interface (GUI) 260, as illustrated in FIG. 2C.

In some aspects, and using any of the exemplary processes described herein, an application program executed by client device 102, such as a payment application, may cause client device 102 to exchange data with a POS terminal, such as POS terminal 122, over a direct communications channel. As described herein, the exchange of data may initiate and facilitate a transaction to purchase a good or service from a merchant 121, e.g., a purchase of a breakfast pastry or a cup of coffee from the bakery during the lunch or afternoon shifts described above, and in accordance with the 25% discount provided by the promotional campaign. Further, although not illustrated in FIG. 2C, additional or alternate ones of the selected proximate client devices (e.g., as identified within selected device data 247) may perform any of the exemplary processes described herein to render notification data consistent with the first promotional campaign for presentation on a corresponding interface.

Figure 3:
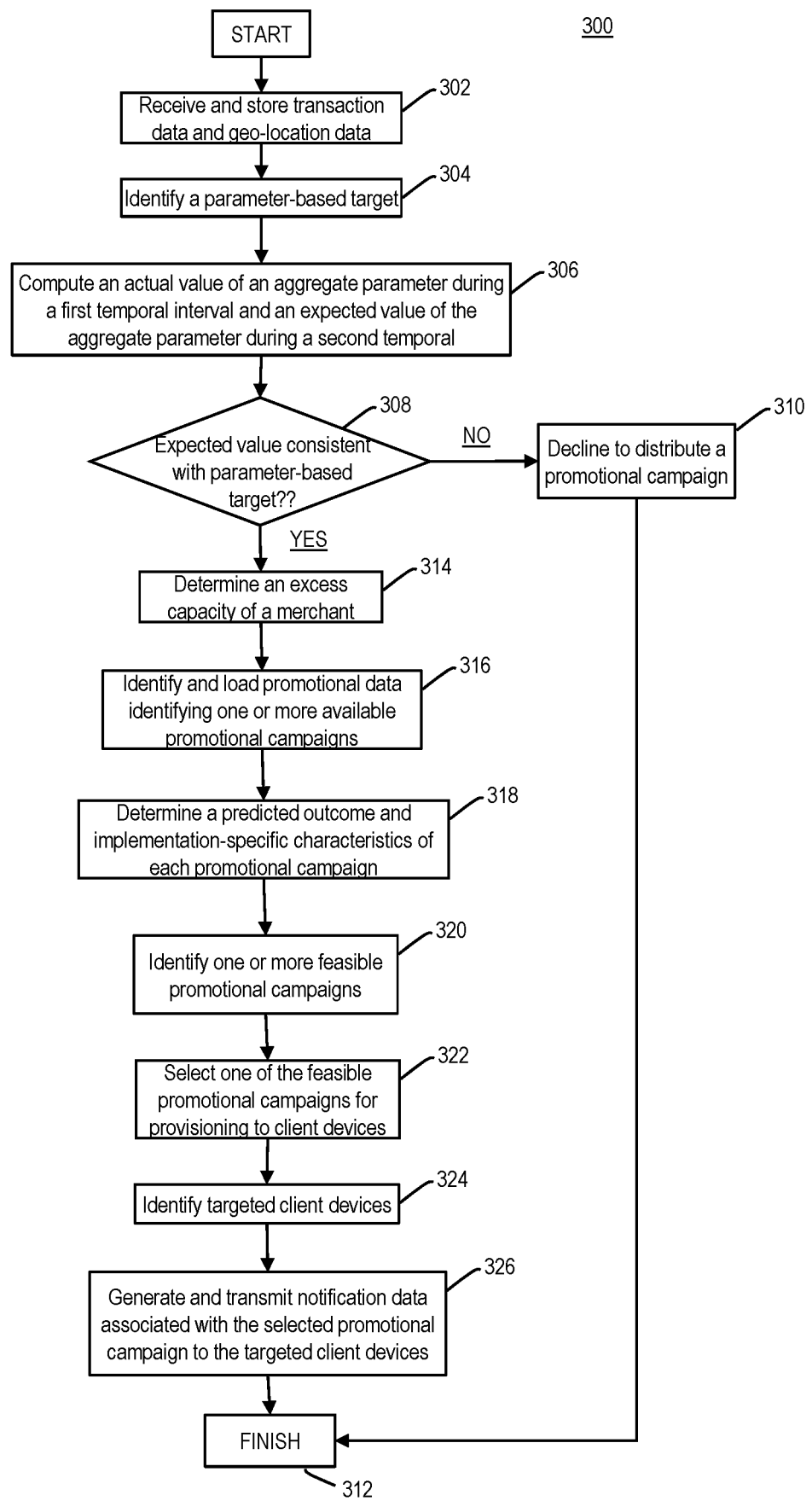
FIG. 3 is a flowchart of exemplary processes for generating automatically generating and provisioning notification data to dynamically selected network-connected devices, in accordance with the disclosed embodiments.

FIG. 3 is a flowchart of an exemplary process 300 for automatically generating and provisioning notification data to a dynamically selected set of network-connected devices operating within a computing environment, in accordance with the disclosed embodiments. In some embodiments, a computing system, such as content delivery system 160, may perform the steps of exemplary process 300.

Referring to FIG. 3, content delivery system 160 may receive transaction data characterizing transactions initiated during a first temporal period (e.g., in step 302). As described herein, one or more of the transactions may be initiated at a network-connected terminal device, such as POS terminal 122, that is associated with, and operated by, a merchant, such as merchant 121, and the initiated transactions may correspond to purchases of a corresponding good or service from merchant 121 by a corresponding customer, such as user 101 that operates client device 102. In some aspect, the received transaction data may specify, for each initiated transaction, a unique transaction identifier (e.g., as generated by POS terminal 122), a unique identifier of POS terminal 122 (e.g., an IP or MAC address), a unique identifier of the client device that initiated the purchase transaction (e.g., an IP or MAC address of client device 102), and/or values of one or more parameters that characterize the initiated transaction. Examples of these transaction parameter values include, but are not limited to, a transaction amount, an identifier of the good or service involved in the transaction (e.g., the assigned UPC), a quantity of the involved good or service, or a transaction date or time.

Further, in step 302, content delivery system 160 may receive geo-location data characterizing a geographic position of one or more client devices, such as client device 102, at corresponding times and/or dates. In some aspects, the received geo-location data may include, but is not limited to, a unique identifier of each corresponding client device (e.g., an IP address or a MAC address of client device 102) and geo-location data specifying geographic positions (e.g., a latitude, longitude, or altitude of client device 102) at corresponding times and/or dates. In some instances, the client devices, including client device 102, may be configured to transmit or "push" the determined geographic positions and corresponding times and/or dates across network 120 to content delivery system 160. In additional aspects, content delivery system 160 may perform additional operations that which performs operations that store the received transaction data and the received geo-location data in corresponding portions of one or more tangible, non-transitory memories, e.g., within respective ones of merchant database 162 and device database 164.

Content delivery system 160 may perform additional operations that identify a parameter-based target established by merchant 121, e.g., parameter-based target data 206 within merchant database 162 (e.g., in step 304). In some aspects, as described herein, parameter-based target data 206 may identify and specify one or more parameter-based targets for transactions initiated at POS terminal 122 during a second temporal interval. Further, as described herein, examples of the parameter-based targets may include, but are not limited a revenue target (e.g., a specified amount of revenue during the second temporal interval, or a desire to maximize revenue during the second temporal interval) or a capacity target (e.g., a specified reduction in the available inventory of a particular good or service during the second temporal interval, or a desire to sell an entire quantity of the available inventory of the particular good or service during the second temporal interval).

In some aspects, and based on portions of the received transaction data and the identified parameter-based target, content delivery system 160 may perform any of the exemplary processes described herein to compute an actual value of an aggregate parameter during the first temporal interval, and an expected value of the aggregate parameter during the second temporal (e.g., in step 306). In some instances, the aggregate transaction parameter may be consistent with the parameter-based target established by merchant 121. For example, for a parameter-based target that corresponds to a revenue target (e.g., a specified amount of revenue), the aggregate transaction parameter may include, but is not limited to, a total revenue derived from transactions initiated at POS terminal 122. In other examples, for a parameter-based target that corresponds to a capacity target (e.g., a specified reduction in the inventory of a particular good or service maintained by merchant 121), the aggregate transaction parameter may include, but is not limited to a total number of units of a particular good or service involved in transactions initiated at POS terminal 122. For instance, one or more of the capacity targets may be established in response to a temporal restriction imposed on or associated with a particular good or service, such as reduction in all inventory of a particular good, such as a food product, having a corresponding temporal expiration date.

Content delivery system 160 may also perform operations that determine whether the expected value of the aggregate transaction parameter during the second temporal interval is consistent with the parameter-based target (e.g., in step 308). For example, when the expected value of the aggregate transaction parameter is equivalent to or exceeds the parameter-based target (e.g., step 308; YES), content delivery system 160 may determine that a promotional campaign is unnecessary to meet the established parameter-based target of merchant 121 during the second temporal interval (e.g., in step 310). Exemplary process 300 is then complete in step 312, and content delivery system 160 may await repeat a performance of these exemplary processes in response to a detected expiration of the second temporal interval or a detection of an additional or alternate revenue or capacity target specified by merchant 121.

Alternatively, when the expected value of the aggregate transaction parameter fails to exceed the parameter-based target (e.g., step 308; NO), content delivery system 160 may perform any of the exemplary processes described herein to determine a quantity of one or more particular goods or services are maintained by merchant 121 and available for sale in purchase transactions initiated at POS terminal 122 during the second temporal interval (e.g., in step 314). The available quantity of goods or services may, in some instances, represent an "excess capacity" of merchant 121. Content delivery system 160 may also perform operations that identify and load, from a tangible, non-transitory memory, promotional data characterizing one or more promotional campaigns associated with merchant 121 and available for delivery to one or more client devices operating within environment 100 (e.g., in step 316).

In some aspects, described herein, each of the promotional campaigns may be associated with one or more elements of digital content (e.g., textual content, graphical content, video content, and/or audible content included within the corresponding promotional data) and a corresponding promotion, such as a percentage or absolute discount on a purchase transaction initiated at merchant 121. Further, the promotional data may include, for each promotional campaign, parameter data (e.g., metadata) that identifies merchant 121 and/or POS terminal 122, and that characterizes one or more parameters of the promotion, such as, but not limited to, a type of the promotion (e.g., a discount), a promotion amount (e.g., a percentage, an absolute amount, etc.), or a good or service involved in the promotion.

Referring back to FIG. 3, content delivery system 160 may perform any of the exemplary processes described herein to determine a predicted outcome associated with each of the promotional campaigns, and further, one or more implementation-specific characteristics that facilitate each of the predicted outcomes (e.g., in step 318). By way of example, the predicted outcome for a corresponding one of the promotional campaigns may, for example, identify a number of additional transactions expected to be initiated at POS terminal 122 during the second temporal interval as a result of the corresponding promotional campaign and further, an impact of these additional initiated transactions on the expected value of the aggregate parameter during the second temporal interval. Further, examples of the implementation-specific characteristics of each promotional campaign may include, but are not limited to, a promotional value (e.g., a percentage discount or an absolute discount), a good or service associated with the promotion, a number of client devices that initiate transactions at POS terminal 122 in response to the promotional campaign, or a period of validity of the promotional campaign.

Content delivery system 160 may also perform any of the exemplary processes described herein to identify one or more of the promotional campaigns that can be feasibly implemented within environment 100 based on, among other things, the corresponding predicted outcomes and the corresponding implementation-specific characteristics (e.g., in step 320). In some instances, and as described herein, the content delivery system 160 may establish the feasibility of a corresponding promotional campaign based on a comparison between the predicted outcomes and/or the implementation-specific characteristics, and the excess capacity of merchant 121, the number of client devices available within environment 100, and one or more promotion-specific rules, such as a discount floor or ceiling.

In some aspects, content delivery system 160 may perform any of the exemplary processes described herein to select one of the feasible promotional campaigns for implementation and distribution (e.g., in step 322). For example, in step 322, content delivery system 160 may perform operations that select a corresponding one of the feasible promotional campaigns associated with a predicted outcome that is consistent with one or more of the parameter-based targets described herein, such as those established by merchant 121. In one example, the predicted outcome of the selected promotional campaign may result in a change in the expected value of the aggregate parameter that exceeds, or best approximates, the target value of the aggregate parameter during the second temporal interval, as established by merchant 121. The disclosed embodiments are not limited to these exemplary metrics of predicted outcomes, and in other aspects, the predicted outcome associated with the selected promotional campaign may be described in terms of any additional or alternate characteristic appropriate to merchant 121.

Further, in step 324, content delivery system 160 may perform any of the processes described herein to identify one or more client devices capable of receiving and implementing the selected feasible promotional campaign. For example, in step 324, content delivery system 160 may perform any of the processes described herein to identify one or more client devices that are disposed proximate to a geo-location of merchant 121, and to determine a particular number of the proximate client devices that should be targeted with the first promotional campaign, e.g., a "targeted" number of proximate client devices. In some examples, as described herein, the geo-location of merchant 121 may be established based on, and may correspond to, a geo-location of POS terminal 122 within a corresponding geographic region. Additionally, in step 324, content delivery system 160 may perform any of the exemplary processes described herein to select subset of the proximate client devices (e.g., client device 102) that will receive notification data consistent with the selected feasible promotional campaign. In some instances, the selected subset of the proximate client devices may include at least the targeted number of proximate client devices, and as described herein, the customers operating the selected subset of the proximate client devices (e.g., user 101 that operates client device 102) are likely to be receptive to the first promotional campaign, and are likely to initiate a purchase transaction at POS terminal 122 of merchant 121 in response to the first promotional campaign.

Content delivery system 160 may perform any of the exemplary processes described herein to generate promotional notification data that characterizes the selected feasible promotional campaign, and to transmit that promotional notification data to a unique network address associated with each of the selected subset of the client devices (e.g., in step 326). Exemplary process 300 is then complete in step 312.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including initiation module 202, parameter value module 208, target consistency module 212, promotion selection module 216, excess capacity module 218, local outcome module 222, dynamic pricing module 232, feasibility module 236, local selection module 240, device targeting module 242, rules-based machine learning module 242A, clustering analysis module 242B, collaborative filtering module 242C, notification generation module 248, display module 254, and interface element generation module 256, can be implemented as one or more computer programs, i.e., one or more modules of computer program instructions encoded on a tangible non transitory program carrier for execution by, or to control the operation of, a data processing apparatus (or a computer system). Additionally or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
  a communications unit;
  a storage unit storing instructions; and
  at least one processor coupled to the communications unit and the storage unit, the at least one processor being configured to execute the instructions to:
    receive, via the communications unit, first information identifying first purchase transactions initiated at a terminal device during a first temporal interval;
    compute, based on the first information, an expected value of an aggregate transaction parameter of the first purchase transactions during a second temporal interval;
    determine that the expected value is inconsistent with a target value of the aggregate transaction parameter during the second temporal interval;
    based on the determination that the expected value is inconsistent with the target value, load, from the storage unit, second information characterizing a second purchase transaction capable of initiation at the terminal device during the second temporal interval, the second information comprising digital content representative of an incentive to initiate the second purchase transaction during the second temporal interval;
    receive, via the communications unit, positional data from a client device, the positional data characterizing a geographic position of the client device within a geographic region;
    based on the positional data, determine that the client device is disposed within a threshold distance of a geographic position of the terminal device; and
    based on the determination that the client device is disposed within the threshold distance of the geographic position of the terminal device, and based on a determination that the client device exhibits a first device characteristic associated with the second purchase transaction, transmit, via the communications unit, a portion of the second information to the client device, the transmitted portion of the second information causing the client device to present data associated with the second purchase transaction on a corresponding interface, the presented data comprising the digital content.

2. The apparatus of claim 1, wherein
  the at least one processor is further configured to execute the instructions to receive the first information from the terminal device via the communications unit at predetermined temporal intervals.

3. The apparatus of claim 1, wherein the at least one processor is further configured to execute the instructions to store the positional data within a corresponding portion of the storage unit.

4. The apparatus of claim 1, wherein the at least one processor is further configured to execute the instructions to:
  identify and load, from the storage unit, at least a portion of the positional data that characterizes the geographic position of the client device; and
  establish that the client device is disposed proximate to the geographic position of the terminal device when the client device is disposed within the threshold distance of the geographic position of the terminal device.

5. The apparatus of claim 1, wherein the at least one processor is further configured to execute the instructions to:
  Identify and load, from the storage unit, additional positional data characterizing geographic positions of a plurality of client devices that exhibit the device characteristic associated with the second purchase transaction;
  determine that the geographic position of each of the plurality of client devices is disposed within the threshold distance of the geographic position of the terminal device; and
  based on the determination that the geographic position of each of the plurality of client devices is disposed within the threshold distance of the geographic position of the terminal device, transmit, via the communications unit, the portion of the second information to each of the plurality of client devices.

6. The apparatus of claim 1, wherein the at least one processor is further configured to execute the instructions to:
  identify and load, from the storage unit, a value of a second device characteristic;
  based on the second device characteristic value and the second information, determine that the initiation of the second purchase transaction is feasible during the second temporal interval; and
  transmit, via the communication unit, the portion of the second information to the client device when the client device exhibits the first device characteristic associated with the second transaction, when the geographic position of the client device is disposed within the threshold distance of the geographic position of the terminal device, and when the initiation of the second purchase transaction is feasible during the second temporal interval.

7. The apparatus of claim 6, wherein:
  the second purchase transaction is associated with a value of a transaction parameter; and
  the second device characteristic value reflects a capacity of the terminal device or a computing system in communication with the terminal device to execute the initiated second purchase transaction during the second temporal interval and in accordance with the value of the transaction parameter.

8. The apparatus of claim 1, wherein the at least one processor is further configured to execute the instructions to:
  identify and load, from the storage unit, third information characterizing a plurality of candidate purchase transactions capable of initiation during the second temporal interval, each of the candidate purchase transactions being associated with a value of a transaction parameter;
  compute, for each of the candidate purchase transactions, an additional expected value of the aggregate transaction parameter during the second temporal interval based on the first information and the corresponding value of the transaction parameter;
  determine that a corresponding one of the additional expected values is equivalent to or exceeds the target value; and
  transmit a portion of the third information to the client device via the communications unit, the third signal comprising a portion of the third information, the portion of the third information characterizing the candidate purchase transaction that is associated with the corresponding one of the additional expected values.

9. The apparatus of claim 6, wherein:
the second purchase transaction is characterized by a value of a transaction parameter; and
the at least one processor is further configured to execute the instructions to modify the value of the transaction parameter based on at least one of the expected parameter value or the target parameter value.

10. The apparatus of claim 1, wherein the second temporal interval occurs subsequent to the first temporal interval.

11. The apparatus of claim 1, wherein the at least one processor is further configured to execute the instructions to:
identify a number of additional client devices that are disposed within a threshold distance of the predetermined geographic position;
based on the second information, determine that the initiation of the second purchase transaction by the additional client devices is feasible during the second temporal interval; and
transmit, via the communication unit, at least a portion of the second information to at least one of the additional client devices.

12. The apparatus of claim 1, wherein the at least one processor is further configured to execute the instructions to:
receive, via the communications unit, additional information characterizing at least the second purchase transaction, the second purchase transaction being initiated at the terminal device by the client device during the second temporal interval;
based on at least the additional information, compute an additional expected value of the aggregate transaction parameter, and determine that the additional expected value is inconsistent with the target value;
based on the determination that the additional expected value is inconsistent with the target value, modify at least a portion of the second information, and transmit, via the communications interface, the modified portion of the second information to at least one of (i) the client device or (ii) an additional client device, the additional client device being disposed within the threshold distance of the geographic position of the terminal device and exhibiting the first device characteristic.

13. A computer-implemented method, comprising:
receiving, by at least one processor, first information identifying first purchase transactions initiated at a terminal device during a first temporal interval;
based on the first information, computing, by the at least one processor, an expected value of an aggregate transaction parameter of the first purchase transactions during a second temporal interval;
determining, by the at least one processor, that the expected value is inconsistent with a target value of the aggregate transaction parameter during the second temporal interval;
based on the determination that the expected value is inconsistent with the target value, identifying and loading, by the at least one processor, and from a storage unit, second information characterizing a second purchase transaction capable of initiation during the second temporal interval, the second information comprising digital content representative of an incentive to initiate the second purchase transaction with a counterparty during the second temporal interval;
receiving, by the at least one processor, positional data from a client device, the positional data characterizing a geographic position of the client device within a geographic region;
based on the positional data, determining, by the at least one processor, that the client device is disposed within a threshold distance of a geographic position of the terminal device; and
based on the determination that the client device is disposed within the threshold distance of the geographic position of the terminal device, and based on a determination that the client device exhibits a first device characteristic associated with the second purchase transaction, transmitting, by the at least one processor, a portion of the second information to the client device, the transmitted portion of the second information causing the client device to present data associated with the second purchase transaction on a corresponding interface, the presented data comprising the digital content.

14. The method of claim 13, wherein
the method further comprises receiving, by the at least one processor, the first information from the terminal device at predetermined temporal intervals.

15. The method of claim 13, further comprising
storing, by the at least one processor, the positional data within a corresponding portion of the storage unit.

16. The method of claim 13, further comprising:
by the at least one processor, identifying and loading, from the storage unit, at least a portion of the positional data that characterizes the geographic position of the client device;
and
establishing, by the at least one processor, that the client device is disposed proximate to the geographic position of the terminal device when the client device is disposed within the threshold distance of the geographic position of the terminal device.

17. The method of claim 13, further comprising:
Identifying and loading, by the at least one processor, and from the storage unit, additional positional data characterizing geographic positions of a plurality of client devices that exhibit the device characteristic associated with the second purchase transaction;
determining, by the at least one processor, that the geographic position of each of the plurality of client devices is disposed within the threshold distance of the geographic position of the terminal device; and
based on the determination that the geographic position of each of the plurality of client devices is disposed within the threshold distance of the geographic position of the terminal device, transmitting, by the at least one processor, the portion of the second information to the each of the plurality of client devices, the transmitted third signal including the portion of the second information.

18. The method of claim 13, further comprising:
identifying and loading, by the at least one processor, and from the storage unit, a value of a second device characteristic;
based on the second device characteristic value and the second information, determining, by the at least one processor, that the initiation of the second purchase transaction is feasible during the second temporal interval; and
transmitting, by the at least one processor, the portion of the second information to the client device when the client device exhibits the first device characteristic associated with the second purchase transaction, when the geographic position of the client device is disposed within the threshold distance of the geographic position of the terminal device, and when the initiation of the second purchase transaction is feasible during the second temporal interval, wherein:
  the second purchase transaction is associated with a value of a transaction parameter; and
  the second device characteristic value reflects a capacity of the terminal device or a computing system in communication with the terminal device to execute the initiated second purchase transaction during the second temporal interval and in accordance with the value of the transaction parameter.

19. The method of claim 13, further comprising:
identifying and loading, by the at least one processor, from the storage unit, third information characterizing a plurality of candidate purchase transactions capable of initiation during the second temporal interval, each of the candidate purchase transactions being associated with a value of a transaction parameter;
by the at least one processor, computing, for each of the candidate purchase transactions, an additional expected value of the aggregate transaction parameter during the second temporal interval based on the first information and the corresponding value of the transaction parameter;
determining, by the at least one processor, that a corresponding one of the additional expected values is equivalent to or exceeds the target value; and
by the at least one processor, transmitting a portion of the third information to the client device, the portion of the third information characterizing the candidate purchase transaction that is associated with the corresponding one of the additional expected values.

20. The method of claim 13, wherein:
the second purchase transaction is characterized by a value of a transaction parameter; and
the method further comprises modifying, by the at least one processor, the value of the transaction parameter based on at least one of the expected value or the target value.

21. A tangible, non-transitory computer-readable medium storing instructions that, when executed by at least one processor, perform a method comprising:
  receiving first information identifying first purchase transactions initiated at a terminal device during a first temporal interval;
  based on the first information, computing an expected value of an aggregate transaction parameter of the first purchase transactions during a second temporal interval;
  determining that the expected value is inconsistent with a target value of the aggregate transaction parameter during the second temporal interval;
  based on the determination that the expected value is inconsistent with the target value, identifying and loading, from a storage unit, second information characterizing a second purchase transaction capable of initiation during the second temporal interval, the second information comprising digital content representative of an incentive to initiate the second purchase transaction with a counterparty during the second temporal interval;
  receiving positional data from a client device, the positional data characterizing a geographic position of the client device within a geographic region;
  based on the positional data, determining that the client device is disposed within a threshold distance of a geographic position of the terminal device; and
  based on the determination that the client device is disposed within the threshold distance of the geographic position of the terminal device, and based on a determination that the client device exhibits a first device characteristic associated with the second purchase transaction, transmitting a portion of the second information to the client device, the transmitted portion of the second information causing the client device to present data associated with the second purchase transaction on a corresponding interface, the presented data comprising the digital content.

* * * * *